US009611731B2

(12) United States Patent
Hou et al.

(10) Patent No.: US 9,611,731 B2
(45) Date of Patent: Apr. 4, 2017

(54) DETERMINATION OF FORMATION DIP/AZIMUTH WITH MULTICOMPONENT INDUCTION DATA

(71) Applicant: Halliburton Energy Services, Inc., Houston, TX (US)

(72) Inventors: Junsheng Hou, Kingwood, TX (US); Dagang Wu, Katy, TX (US); Burkay Donderici, Houston, TX (US); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 83 days.

(21) Appl. No.: 14/427,914

(22) PCT Filed: Oct. 3, 2014

(86) PCT No.: PCT/US2014/059138
§ 371 (c)(1),
(2) Date: Mar. 12, 2015

(87) PCT Pub. No.: WO2015/051300
PCT Pub. Date: Apr. 9, 2015

(65) Prior Publication Data
US 2016/0258273 A1    Sep. 8, 2016

Related U.S. Application Data

(60) Provisional application No. 61/887,128, filed on Oct. 4, 2013.

(51) Int. Cl.
*E21B 47/022*    (2012.01)
*G01V 99/00*    (2009.01)
(Continued)

(52) U.S. Cl.
CPC .......... *E21B 47/022* (2013.01); *E21B 47/026* (2013.01); *E21B 49/00* (2013.01);
(Continued)

(58) Field of Classification Search
CPC ... G01V 3/28; G01V 3/20; G01V 3/38; G01V 99/005; E21B 47/026; E21B 49/00; E21B 47/024; E21B 47/022; E21B 47/18
(Continued)

(56) References Cited

U.S. PATENT DOCUMENTS 5,591,515 A * 1/1997 Osato ............... G11B 5/09
427/127
6,631,152 B2 * 10/2003 Kaneko ............... H01S 5/1835
372/46.01
(Continued)

FOREIGN PATENT DOCUMENTS

| WO | WO-2011/123379 A1 | 10/2011 |
| WO | WO-2013/036509 A1 | 3/2013 |
| WO | WO-2015/051300 A1 | 4/2015 |

OTHER PUBLICATIONS

Hou, Junsheng, et al., "A new multi-frequency triaxial array induction tool for enhancing evaluation of anisotropic formations and its field testing", *SPWLA 54th Annual Logging Symposium*, New Orleans, LA, (Jun. 22-26, 2013), (2013), 1-16.
(Continued)

*Primary Examiner* — Carol S Tsai
(74) *Attorney, Agent, or Firm* — Gilliam IP PLLC

(57) ABSTRACT

The disclosure describes enhanced determination of dip and strike/azimuth for real-time MCI data processing in some difficult conditions such as low-dip and low-anisotropy formations using formation properties from surrounding layers. The method is effective for the enhanced determination of dip and azimuth to enhance the inversion accuracy of
(Continued)

formation dip and azimuth if the formation anisotropic ratio is low and so reduce the uncertainty of the inverted dip and azimuth.

18 Claims, 20 Drawing Sheets

(51) Int. Cl.
*E21B 49/00* (2006.01)
*E21B 47/026* (2006.01)
*G01V 3/28* (2006.01)
*G01V 3/38* (2006.01)
*E21B 47/024* (2006.01)
*E21B 47/18* (2012.01)

(52) U.S. Cl.
CPC ............... *G01V 3/28* (2013.01); *G01V 3/38* (2013.01); *G01V 99/005* (2013.01); *E21B 47/024* (2013.01); *E21B 47/18* (2013.01)

(58) Field of Classification Search
USPC ............... 702/7, 9, 10, 12; 324/338, 339
See application file for complete search history.

(56) References Cited

U.S. PATENT DOCUMENTS

| | | | |
|---|---|---|---|
| 6,819,112 B2 | 11/2004 | Gianzero et al. | |
| 7,711,486 B2* | 5/2010 | Thigpen | E21B 43/128 702/12 |
| 8,249,844 B2* | 8/2012 | Dale | E21B 41/00 703/10 |
| 8,301,425 B2* | 10/2012 | Dale | E21B 49/00 703/10 |
| 8,433,518 B2* | 4/2013 | Omeragic | G01V 3/20 324/339 |
| 8,682,589 B2* | 3/2014 | Thigpen | E21B 37/06 166/252.1 |
| 8,862,405 B2* | 10/2014 | Seydoux | G01V 3/18 175/45 |
| 9,057,797 B2* | 6/2015 | Omeragic | G01V 3/28 |
| 9,354,353 B2* | 5/2016 | Celepcikay | G01V 3/38 |
| 2004/0117120 A1 | 6/2004 | Frenkel et al. | |
| 2005/0049792 A1 | 3/2005 | Yu et al. | |
| 2006/0161350 A1 | 7/2006 | Wang et al. | |
| 2007/0289740 A1* | 12/2007 | Thigpen | E21B 37/06 166/250.01 |
| 2008/0257544 A1* | 10/2008 | Thigpen | E21B 47/10 166/250.01 |
| 2009/0205819 A1* | 8/2009 | Dale | E21B 41/00 166/250.01 |
| 2009/0216508 A1* | 8/2009 | Dale | E21B 43/00 703/10 |
| 2010/0004866 A1 | 1/2010 | Rabinovich et al. | |
| 2010/0299111 A1* | 11/2010 | Dale | E21B 49/00 703/2 |
| 2011/0011595 A1* | 1/2011 | Huang | E21B 43/00 166/369 |
| 2013/0080058 A1 | 3/2013 | Wu et al. | |
| 2014/0149040 A1* | 5/2014 | Omeragic | G01V 3/20 702/7 |
| 2015/0301222 A1* | 10/2015 | Davydychev | G01V 3/28 324/338 |

OTHER PUBLICATIONS

Kriegshauser, B., et al., "A New Multicomponent Induction Logging Tool to Resolve Anisotropic Formations", *SPWLA 41st Annual Logging Symposium*, Dallas, TX, (Jun. 4-7, 2000), (2000), 1-14.
Rosthal, Richard, et al., "Field test results of an experimental fully-triaxial induction tool", *SPWLA 44th Annual Logging Symposium*, Galveston, TX, (Jun. 22-25, 2003), (2003), 1-14.
"International Application Serial No. PCT/US2014/059138, International Search Report mailed Jan. 13, 2015", 3 pgs.
"International Application Serial No. PCT/US2014/059138, Written Opinion mailed Jan. 13, 2015", 4 pgs.
"European Application Serial No. 14844976.2, Extended European Search Report mailed Oct. 20, 2015", 10 pgs.
"International Application Serial No. PCT/US2014/059138; International Preliminary Report on Patentability mailed Apr. 14, 2016", 6 pgs.
Hou, Junsheng; et al., "Real-Time Borehole Correction of Multicomponent Induction Data Acquired in OBM Wells: Algorithm and Applications", *Petrophysics*, 54(2), (Apr. 2013), 128-141.
Wu, Peter, et al., "Efficient Hierarchical Processing and Interpretation of Triaxial Induction Data in Formations with Changing Dip", *SPE 135442*, presented at the SPE 86th Annual Technical Conference and Exhibition, Florence, Italy, Sep. 19-22, 2010, (2010), 1-14.

* cited by examiner

DETERMINATION OF FORMATION DIP/AZIMUTH WITH MULTICOMPONENT INDUCTION DATA

RELATED APPLICATION

This application is a U.S. National Stage Filing under 35 U.S.C. 371 from International Application No. PCT/US2014/059138, filed on 3 Oct. 2014 which claims the priority benefit of U.S. Provisional Application No. 61/887,128, filed Oct. 4, 2013, which applications and publication are incorporated herein by reference in their entirety.

BACKGROUND

The present disclosure relates generally to methods and systems for determination of formation dip and azimuth, and more particularly, to enhanced methods for determination of formation dip and azimuth using multicomponent induction (MCI) measurements.

MCI tools have been used for different types of anisotropic formation evaluation based on the inverted formation horizontal resistivity (Rh), vertical resistivity (Rv), dip, its azimuth, and other related geological information. Many real-time processing methods are based on radially one-dimensional (R1D) and zero-dimensional (0D) models. In those MCI processing methods, dip and azimuth solution at each depth is obtained relatively independently of one other. However, MCI tools may not be sensitive to certain parameters when each depth calculation is separately considered. For example, in certain sections, anisotropy may be close to unity, which may render MCI tools insensitive to anisotropy dip.

MCI data often lose their sensitivity to dip at isotropic formations (or anisotropic ratios approximately equal to one and at zero-dip azimuths. This may lead to inaccurate or erroneous inversion of formation dip and azimuth in low anisotropic ratio or low-dip formations. Enhancing the accuracy of R1D and 0D MCI processing at low anisotropic ratio or low-dip formations, would improve the determination of formation dip and azimuth with MCI measurements. Further, it would provide additional methods for re-calculating the quality indicators (QI's) for dip and azimuth inversion logs.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

This disclosure describes a method for determining formation dip and azimuth using multicomponent induction measurements. Formation dip and its azimuth are first obtained using conventional MCI data processing, including the obtaining of formation horizontal resistivity, vertical resistivity, and their quality indicators. Subsequently, the recovered formation dip and its azimuth are updated using formation information around the current bed if their formation anisotropic ratios or formation dip are lower than those of the up or down beds. Otherwise, computed quality indicators for the dip and azimuth are updated based on a function of the formation horizontal resistivity, anisotropic ratio, and formation dip values to generate improved final recovered dip and azimuth determinations.

Figure 1:
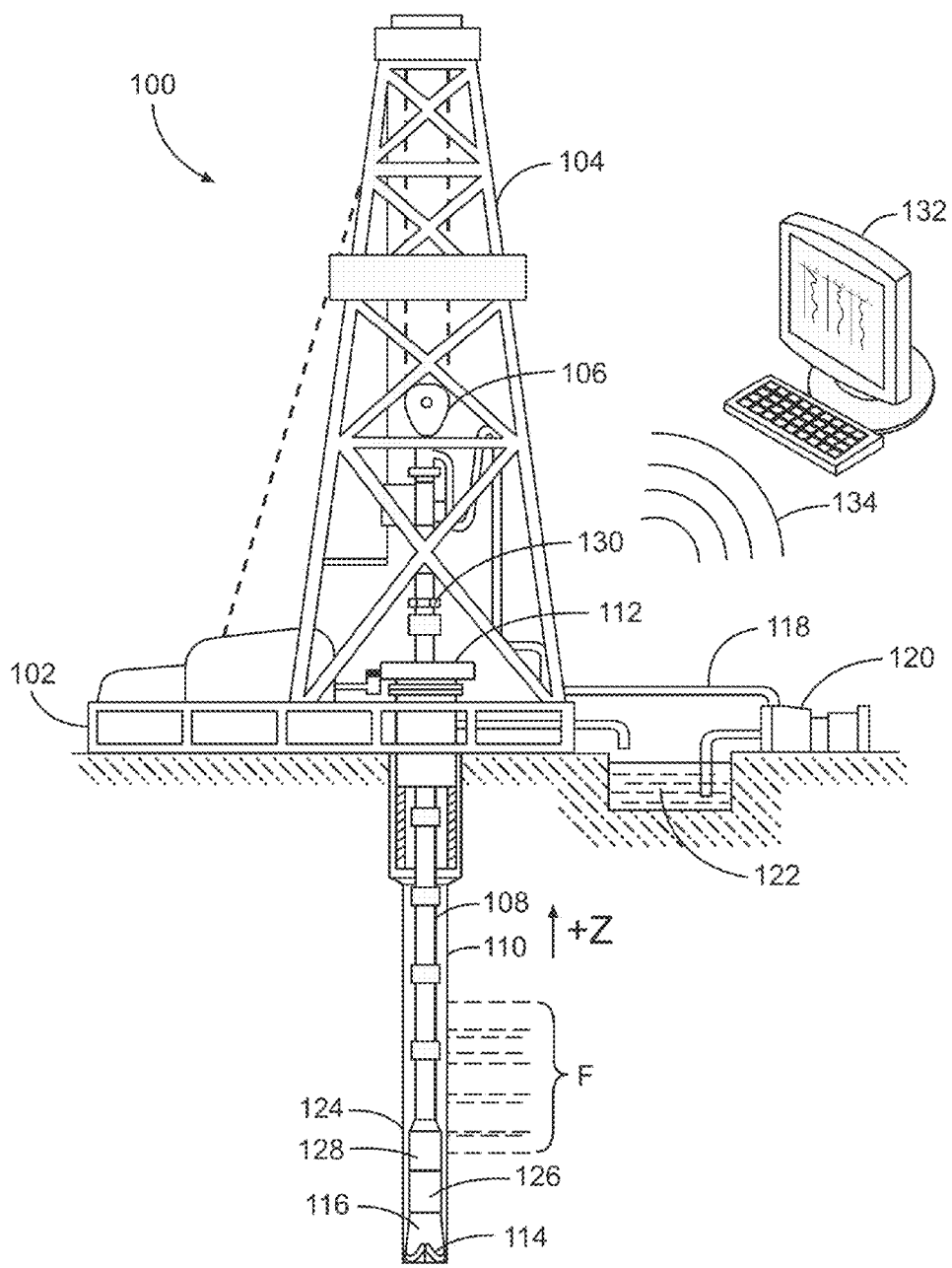
FIG. 1 is a diagram of an illustrative logging while drilling environment.

The disclosed tools and methods are best understood in the context of the larger systems in which they operate. Accordingly, FIG. 1 illustrates an example logging while drilling (LWD) or measuring while drilling (MWD) system 100. A drilling rig or platform 102 supports a derrick 104 or other supporting structure, such as including or coupled to a hoist 106. The hoist 106 is used for raising or lowering equipment or other apparatus such as drill string 108. The drill string 108 accesses a borehole 110, also known as a wellbore, such as through a wellhead 112. The borehole 110 may be drilled in any direction, for example, vertical, inclined, horizontal, and combinations thereof. The lower end of the drill string 108 includes various apparatus, such as a drill head 114, to provide the borehole 110. A downhole motor assembly 116 rotates the drill head 114. As the drill head 114 rotates, it extends the borehole 110 that passes through various subsurface formations F. The downhole motor assembly 116 may include a rotary steerable system (RSS) that enables the drilling crew to steer the borehole 110 along a desired path.

Drilling fluid or "mud" circulates in the annular region around the drill head 114 or elsewhere, such as provided to the borehole 110 through a supply pipe 118, circulated by a pump 120, and returning to the surface to be captured in a retention pit 122 or sump. The drilling fluid transports cuttings from the borehole into the retention pit 122 and aids in maintaining the borehole integrity.

The drill head 114 and downhole motor assembly 116 form a portion of a bottom hole assembly (BHA) 124 that includes one or more drill collars (thick-walled steel pipe) to provide weight and rigidity to aid the drilling process. Various subs or tool assemblies may also be located along the drill string 108 and/or in the BHA 124. As the BHA 124 passes through various regions of the formation F, information may be obtained. For example, the BHA 124 may include a resistivity logging tool 126 that collects measurements relating to various formation properties as well as the tool orientation and/or other drilling conditions. As the drill head 114 extends the borehole 110 through the subsurface formations F, the resistivity logging tool 126 collects multicomponent induction (MCI) measurements as well as measurements of parameters such as position, orientation, weight-on-bit, borehole size, drilling fluid resistivity, and various other drilling conditions.

Tool orientation may be specified in terms of a tool face angle (rotational orientation or azimuth), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the rotational tool face angle, borehole inclination angle (aka "slope"), and compass direction (aka "azimuth"). Such orientation measurements can be combined with gyroscopic or inertial measurements to accurately track tool position. In some embodiments, the tool face angle and borehole inclination angles are calculated from the accelerometer sensor output. The magnetometer sensor outputs are used to calculate the borehole azimuth. With the tool face angle, the borehole inclination, and the borehole azimuth information, various resistivity logging tools disclosed herein can be used to steer the bit to the desired bed.

A telemetry sub 128 is included in the bottomhole assembly 124 to provide a communications link with the surface. The telemetry sub 128 includes wireless telemetry or logging capabilities, or both, such as to transmit or later provide information relating to multicomponent induction data to operators on the surface or for later access in evaluation of formation F properties. Mud pulse telemetry is one common telemetry technique for transferring tool measurements to a surface interface 130 and to receive commands from the surface interface 130, but other telemetry techniques can also be used. For example, the surface interface 130 includes one or more of wireless telemetry, processor circuitry, or memory facilities, such as to support log-while-drilling (LWD) or measurement-while-drilling (MWD) operations.

A surface processor, shown in FIG. 1 in the form of a computer 132, communicates with surface interface 130 via a wired or wireless network communications link 134, and provides a graphical user interface (GUI) or other form of interface that enables a user to provide commands and to receive and optionally interact with a visual representation of the acquired measurements. The surface processor can take alternative forms, including a desktop computer, a laptop computer, an embedded processor, a cloud computer, a central processing center accessible via the internet, and any combination of the foregoing. In many examples, the surface processor will include one or more processors in combination with additional hardware as needed (volatile and/or non-volatile memory; communication ports; I/O device(s) and ports; etc.) to provide the formation dip and azimuth determinations as described herein. An example surface processor can serve to control the functions of the drilling system 100 and to receive and process downhole measurements transmitted from the telemetry sub 128 to control drilling parameters. In such examples, one or more a non-volatile, machine-readable storage devices (i.e., a memory device (such as DRAM, FLASH, SRAM, or any other form of storage device; which in all cases shall be considered a non-transitory storage medium), a hard drive, or other mechanical, electronic, magnetic, or optical storage mechanism, etc.) will contain instructions suitable to cause the processor to describe the desired functionality, such as the various examples discussed herein). The surface processor operates in accordance with software (which may be stored on non-volatile, machine-readable storage devices) and user input via an input device to process and decode the received signals. The resulting telemetry data may be further analyzed and processed by the surface processor to generate a display of useful information on a computer monitor or some other form of a display device. Of course, these functions may be implemented by separate processing units, as desired, and additional functions may be performed by such one or more processing units in response to similarly stored instructions.

Figure 2:
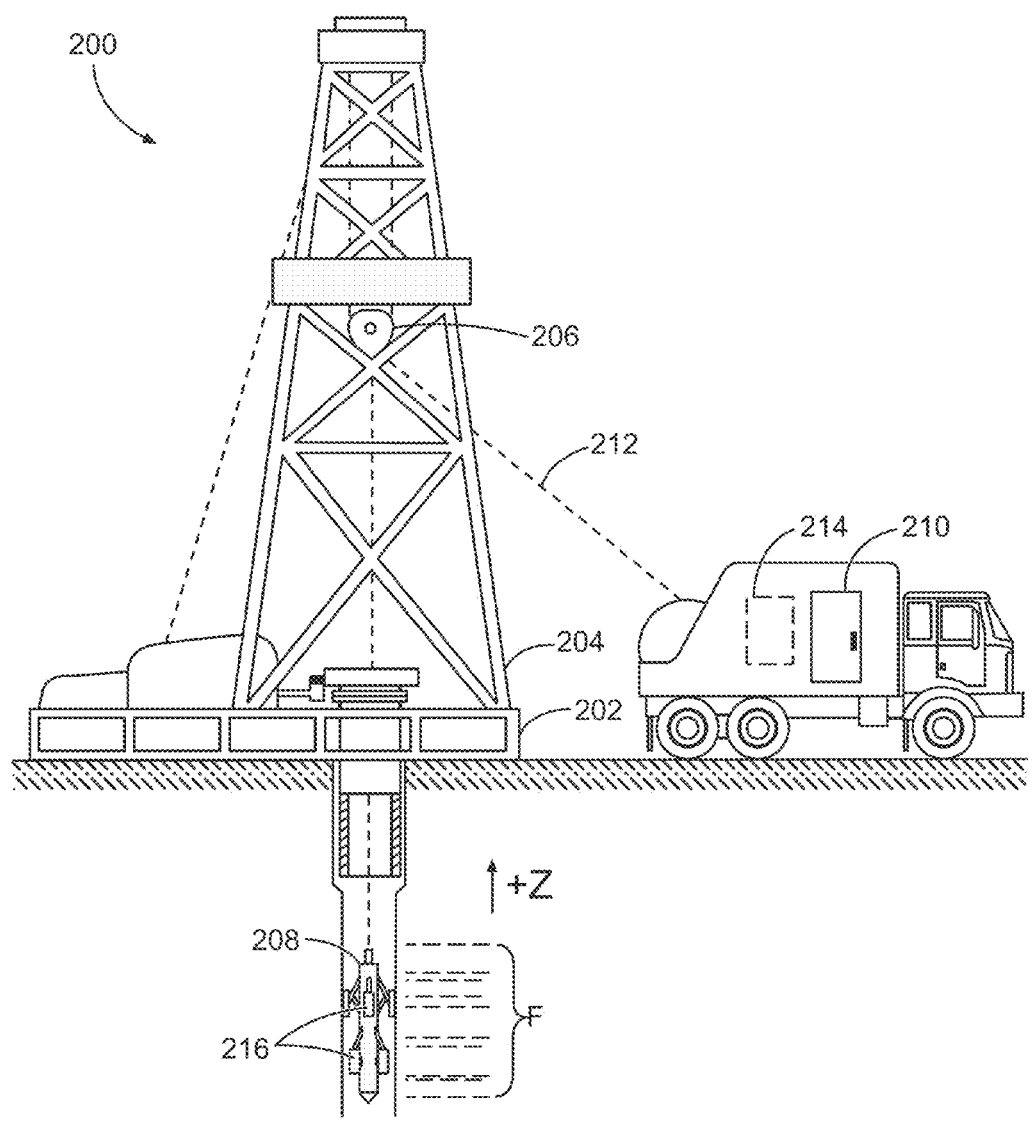
FIG. 2 is a diagram of an illustrative wireline logging environment.

At various times during the drilling process, the drill string 108 may be removed from the borehole, allowing wireline logging operations to be conducted in a wireline logging system 200 as shown in FIG. 2. A platform 202, such as coupled to a derrick 204, includes a hoist 206 that is used to raise or lower equipment such as a wireline logging tool 208, such as a wireline sonde, into or out of a borehole. The wireline logging tool 208 may have pads and/or centralizing springs to maintain the tool near the axis of the borehole as the tool traverses the borehole. In this wireline example, a logging facility 210 (e.g., logging truck) suspends the wireline logging tool 208 on a wireline cable 212 providing a communicative coupling between the wireline logging tool 208 and the logging facility 210.

Measurements from the formation F may be obtained, such as using a resistivity logging tool included as at least a portion of the wireline logging tool 208. The wireline cable 212 includes conductors for transporting power to the tool and telemetry from the tool to the surface, where the logging facility 210 includes a processor 214 (e.g., a computer or other storage or control circuitry) that acquires and stores measurement data from the wireline logging tool 208.

For purposes of illustration, the examples of FIGS. 1 and 2 show a vertically-oriented borehole configuration. However, the tools and methods described herein may also be used in other borehole configurations, such as a borehole including a horizontal penetration direction, or an oblique borehole configuration, for example. The examples of FIGS. 1 and 2 also generally illustrate land-based examples. Alternatively, the apparatus and techniques described herein may be used in offshore environments as well, such as for subsea operations. In particular, offshore or subsea operations may include use of wireline or LWD/MWD apparatus and techniques including aspects of the examples herein.

Figure 3:
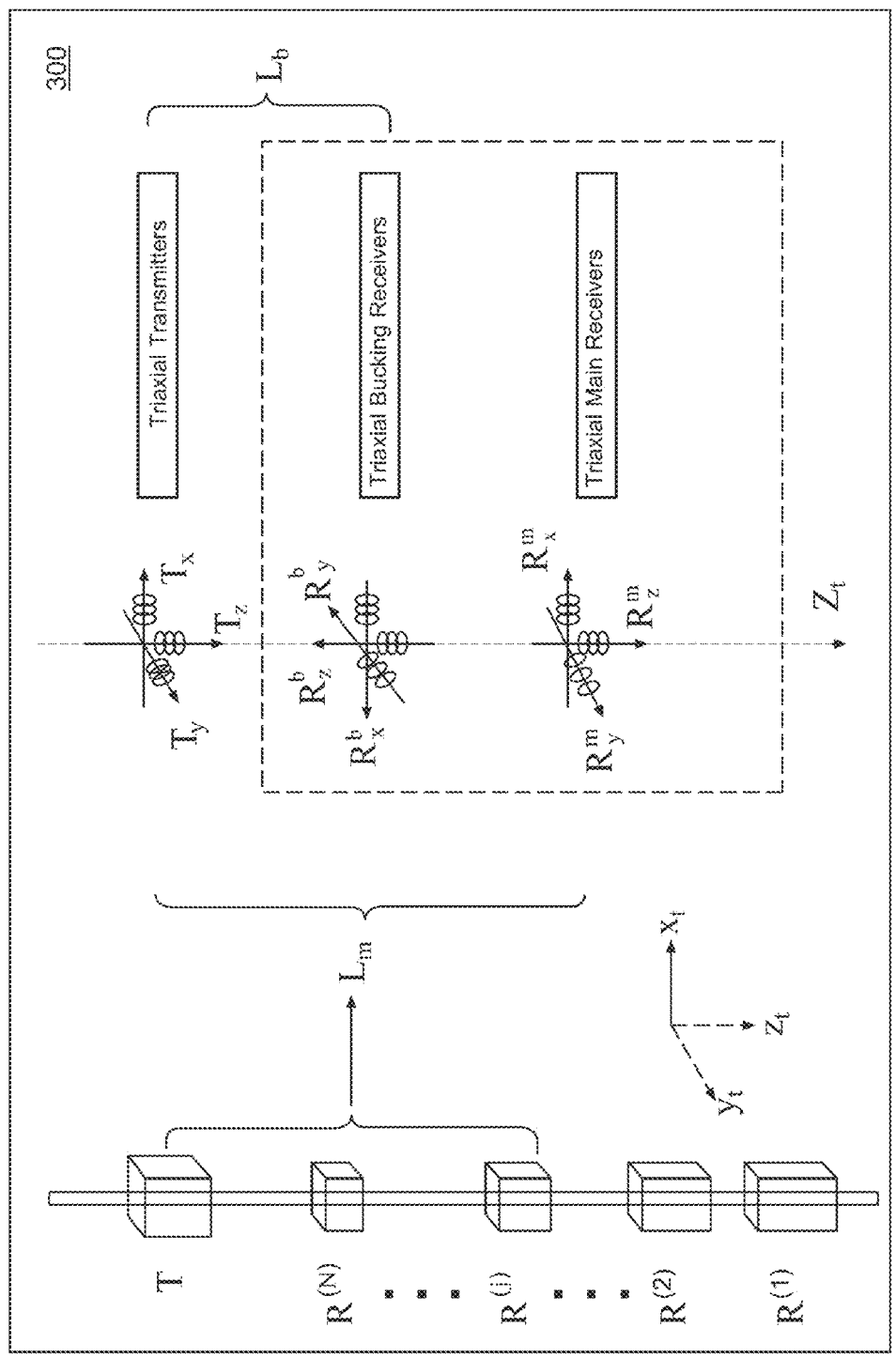
FIG. 3 is a schematic diagram depicting an example configuration of a multi-array, tri-axial induction tool.

FIG. 3 is a schematic diagram showing an example configuration of a resistivity logging tool 300. The resistivity logging tool 300 is a multi-array, tri-axial induction tool having antennas for acquiring multi-component induction logging measurements. The resistivity logging tool 300 includes multiple tri-axial sub-arrays (e.g., $TR^{(1)}$, $TR^{(2)}$, ..., and $TR^{(N)}$), with each sub-array comprising three mutually orthogonal and collocated antennas. A triad of transmitters (e.g., $T_x$, $T_y$, and $T_z$) represent magnetic dipole antennas oriented parallel to the tool's x, y, and z axes, respectively. A triad of main receives (e.g., $R_x^m$, $R_y^m$, and $R_z^m$) represent magnetic dipole antennas oriented along those axes, as do a triad of bucking receivers (e.g., $R_x^b$, $R_y^b$, and $R_z^b$). In some embodiments, the signal measurements of the bucking receiver triad can be subtracted from the main receiver triad to eliminate the direct signal from the transmitter and increase sensitivity to formation properties.

Each tri-axial sub-array includes the transmitter triad ($T_x$, $T_y$, and $T_z$), and a separate main receiver triad ($R_x^m$, $R_y^m$, and $R_z^m$) and bucking receiver triad ($R_x^b$, $R_y^b$, and $R_z^b$) for each receiver (e.g., $R^{(1)}$, $R^{(2)}$, ..., and $R^{(N)}$). The main receiver triad is spaced at a distance $L_m$ from the transmitter triad, and the bucking receiver triad is spaced at a distance $L_b$ from the transmitter triad. In the antenna configuration of resistivity logging tool 300, if each transmitter of a tri-axial sub-array is fired in turn, and signal measurements are made at each receiver in response to each firing, nine different voltage measurements are produced at every log depth in a measurement coordinate system (e.g., denoted as $x_t$, $y_t$, $z_t$ in FIG. 3).

Voltages measured at the receivers are converted into apparent conductivities. The apparent conductivities can be expressed as a 3 by 3 tensor (also known as, a matrix) for a multi-array, tri-axial tool operated at multiple frequencies, which may be represented in the following manner:

$$\overline{\overline{\sigma_a^{(i,j)}}} = \begin{pmatrix} \sigma_{xx}^{(i,j)} & \sigma_{xy}^{(i,j)} & \sigma_{xz}^{(i,j)} \\ \sigma_{yx}^{(i,j)} & \sigma_{yy}^{(i,j)} & \sigma_{yz}^{(i,j)} \\ \sigma_{zx}^{(i,j)} & \sigma_{zy}^{(i,j)} & \sigma_{zz}^{(i,j)} \end{pmatrix} = (\sigma_{IJ}^{(i,j)})_{(3\times3)} \quad (1)$$

$$\overline{\overline{\sigma_a^{(i,j)}}} = \begin{pmatrix} XX^{(i,j)} & XY^{(i,j)} & XZ^{(i,j)} \\ YX^{(i,j)} & YY^{(i,j)} & YZ^{(i,j)} \\ ZX^{(i,j)} & ZY^{(i,j)} & ZZ^{(i,j)} \end{pmatrix} = (IJ^{(i,j)})_{(3\times3)} \quad (2)$$

In the above conductivity tensor, I, J=x/X, y/Y, z/Z, i=1, 2, ..., N; j=1, 2, ..., M. $\overline{\overline{\sigma_a^{(i,j)}}}$ is referred to as the MCI apparent conductivity tensor (R- or X-signal) in the tool coordinate system. $\sigma_{IJ}^{(i,j)}/IJ^{(i,j)}$ are the measured-conductivity couples of $\overline{\overline{\sigma_a^{(i,j)}}}$, wherein subscript I indicates the transmitter direction and subscript J indicates the receiver direction. When I, J=x/X, $\sigma_{IJ}^{(i,j)}$ is $\sigma_{xx}^{(i,j)}$ (or $XX^{(i,j)}$), when I, J=y/Y, $\sigma_{IJ}^{(i,j)}$ is $\sigma_{yy}^{(i,j)}$ (or $YY^{(i,j)}$), and when I, J=z/Z, $\sigma_{IJ}^{(i,j)}$ is $\sigma_{zz}^{(i,j)}$ (or $ZZ^{(i,j)}$), which are the traditional multi-array induction measurements, wherein N represents the total number of the tri-axial sub-arrays and M represents the total number of operated frequencies. Therefore, 2*9*M*N R-signal and X-signal data should be present for each log point.

Data Processing Based on Radially One-Dimensional and Zero-Dimension Models

Radially one-dimensional (R1D) and zero-dimension (0D) MCI processing algorithms are used for the real-time recovering of formation horizontal resistivity ($R_h$), vertical resistivity ($R_v$), dip, and azimuth, based either on a radially one-dimensional (R1D) borehole-formation model or a zero-dimensional (0D) formation model. The R1D model is based on a borehole with a circular cross section, the borehole being surrounded by an infinitely-thick and homogenous formation. The borehole may be vertical or deviated, with the MCI logging tool traversing the borehole at either a centralized or a decentralized position within the borehole.

Figure 4:
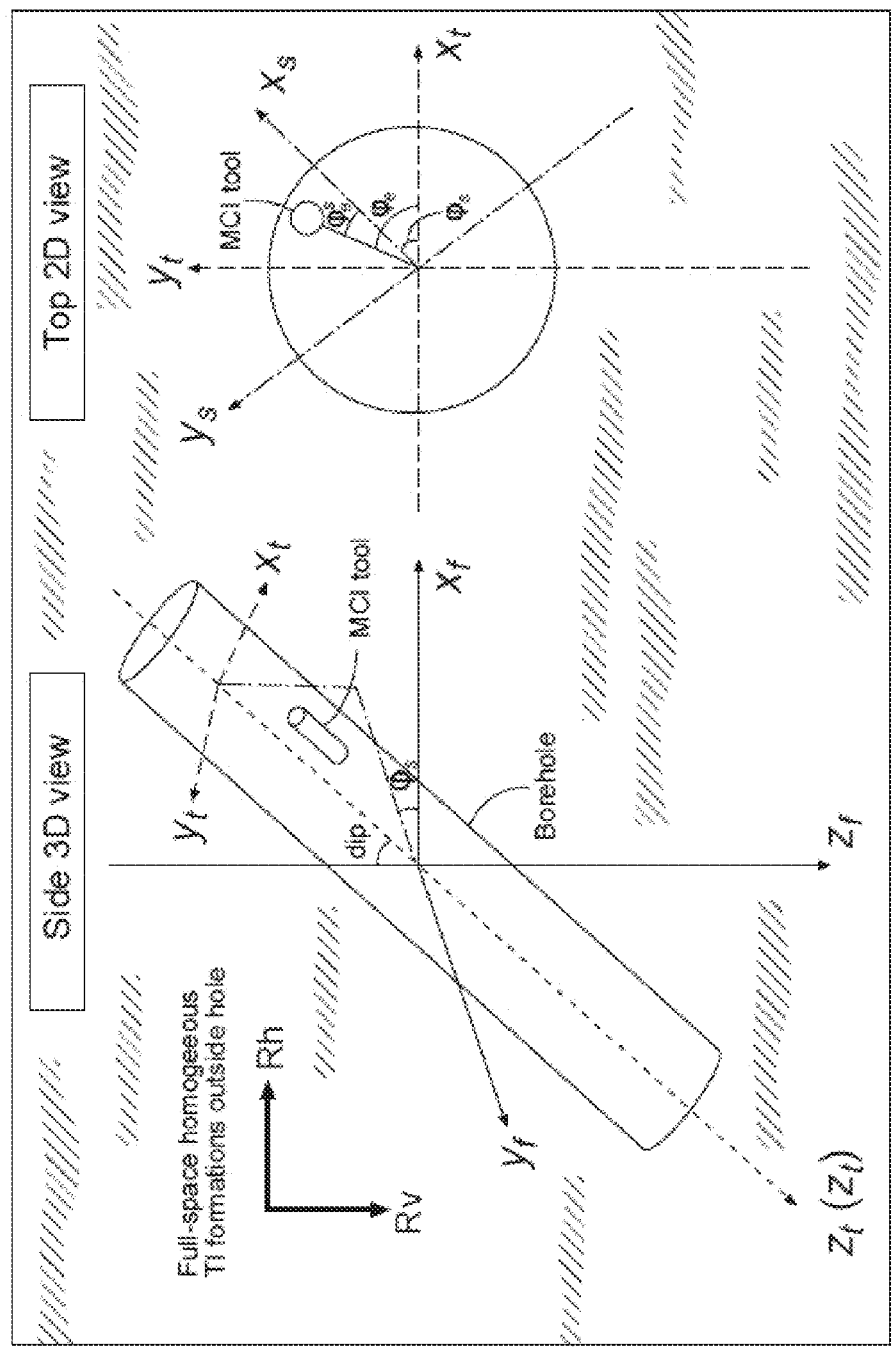
FIG. 4 is a diagram of a radially one-dimensional borehole-formation model for borehole correction.

FIG. 4 is a diagram of an example radially one-dimensional (R1D) borehole-formation model for borehole correction. The homogenous, full-space formation outside of the borehole may be either isotropic or transversely (TI) anisotropic. Formation resistivity or conductivity can be isotropic or transversely isotropic (TI). The coordinates ($x_t$, $y_t$, and $z_t$) represent the MCI tool system, coordinates ($x_f$, $y_f$, and $z_f$) represent the formation system, and coordinates ($x_s$, $y_s$, and $z_s$) represent the strike system. For example, in a dipping bed, the x-axis may be oriented in the direction of deepest ascent (e.g., uphill or downhill). When the formation coordinate system is aligned in this manner, it may be termed "strike-aligned." The MCI tool can be either centralized or decentralized in the borehole and surrounded by the full-space formation. If no borehole exists, the R1D model reduces to a zero-dimension (0D) formation model (not shown).

Figure 5:
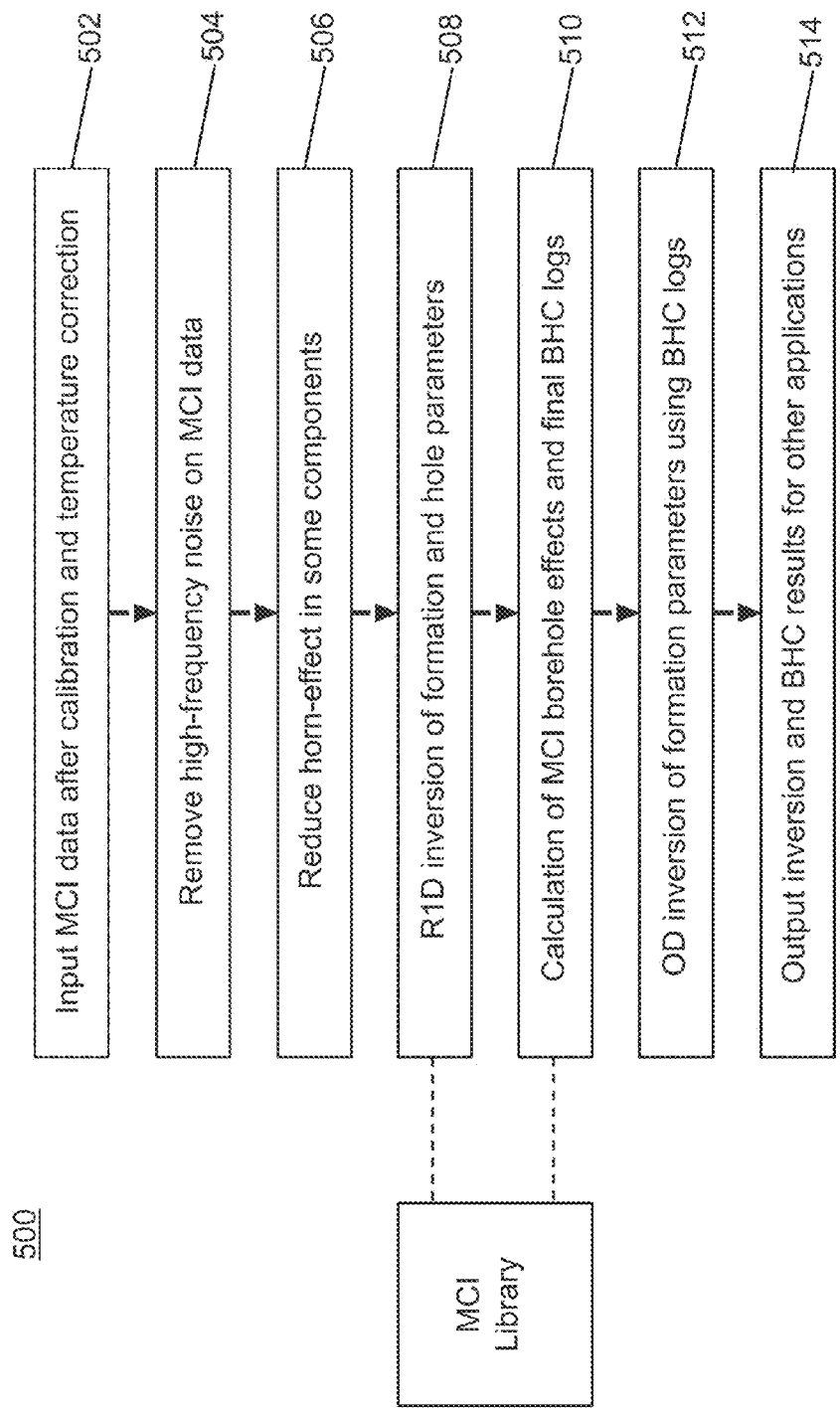
FIG. 5 is a flow diagram of a real-time MCI data processing workflow based on R1D and 0D inversion.

FIG. 5 is a flow diagram of an example MCI data processing workflow 500 based on R1D and 0D inversion. MCI data processing workflow 500 begins at block 502 with inputting MCI data with borehole effects, in which the input MCI data has been calibrated and temperature corrected. At block 504, high-frequency noise is removed from the MCI data. In block 506, horn-effects are reduced in certain MCI data components. At block 508, R1D inversion processing is performed to generate inverted formation and hole parameters. From the R1D inversion step of block 508, the inverted formation $R_h$, $R_v$, dip, azimuth, the tool position in the hole, and the borehole correction (BHC) logs are obtained based on the inverted formation and hole parameters in block 510.

Due to the use of the MCI library as the inversion's forward engine, data processing can be performed in real time. When interpreting MCI data for the purpose of anisotropic formation evaluation, some forward modeling algorithms fail to obtain accurate solutions in a reasonable amount of CPU processing time. Even for the most efficient algorithms, fully 3D inversion is impractical for the real-time or well-site delivery of inverted results from measurements. For fast and accurate 3D electromagnetic forward modeling, a practical 3DFD (finite difference) method based on an isotropic/transverse isotropic (TI) background is used. This method has been tested by fast borehole-effect correction and several independent 3D codes. The time-consuming 3D inversion is generally partitioned into a few simple and fast data processes including resolution enhancement of MCI logs for reducing shoulder-bed effects and low-dimensional inversions such as the R1D inversion, which makes possible the real-time delivery of formation anisotropy (Rh and Rv), dip, and strike information. The R1D inversion is based on a fast and rigorous multistep inversion algorithm and a fast forward modeling engine which consists of the pre-calculated MCI-response library created by using the fast 3DFD method.

0D inversion may also provide the formation $R_h$, $R_v$, dip, azimuth and it is used for evaluating the BHC results in block 512. Both the R1D and 0D inversions are able to provide fast and accurate information regarding the formation $R_h$, $R_v$, dip, and azimuth if the formation anisotropic ratio ($R_{vh}=R_v/R_h$) is low and the formation relative dip angle is close to zero degree. Finally, at block 512, the inversion and BHC results may be outputted for other applications. For example, the methods described herein may use results that are successfully calculated at other depths to assist in the inversion at neighboring depths to obtain visually acceptable logs.

Though arranged serially in the example of FIG. 5, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

MCI Sensitivity to Dip and Azimuth

Formation parameters ($R_h$, $R_v$, dip, and azimuth) may be extracted from measurements in the MCI data by the R1D and 0D inversion processing. However, the R1D and 0D inversions are very dependent on the MCI sensitivity to $R_h$, $R_v$, dip, and azimuth. For the R1D and 0D models, the MCI measurements are sometimes not sensitive to certain formation parameters, such as dip and azimuth. For example, in isotropic formations (or $R_{vh}=1$), the MCI measurements have no sensitivity to the formation dip and azimuth. Therefore, neither dip nor azimuth is recovered accurately from the inversion. Dip and azimuth log data is typically presented without QC information to show the reliability of the results are at each depth. This can lead to instabilities in dip and azimuth results in formation with small anisotropy ($R_v/R_h$<threshold), where thresholds can be chosen 1.05-1.25 based on location and depth.

An examination of MCI sensitivity, defined as the derivative of the MCI response with respect to the formation parameters ($R_h$, $R_v$, dip, and azimuth), provides an indication of the importance of these parameters in MCI tool response. MCI sensitivity to dip and azimuth may be measured using a homogeneous full-space formation (e.g., 0D) model. For the measuring of the sensitivity to dip, the formation dip is set to fifty degrees and the azimuth is set equal to zero degrees. Therefore, there are only five non-zero components—XX, XZ, ZX, YY, and ZZ and the sensitivity is only a function of the formation $R_h$ and $R_v$ (or $R_{vh}$) for a given operating frequency and sub-tri-axial array.

Figure 6:
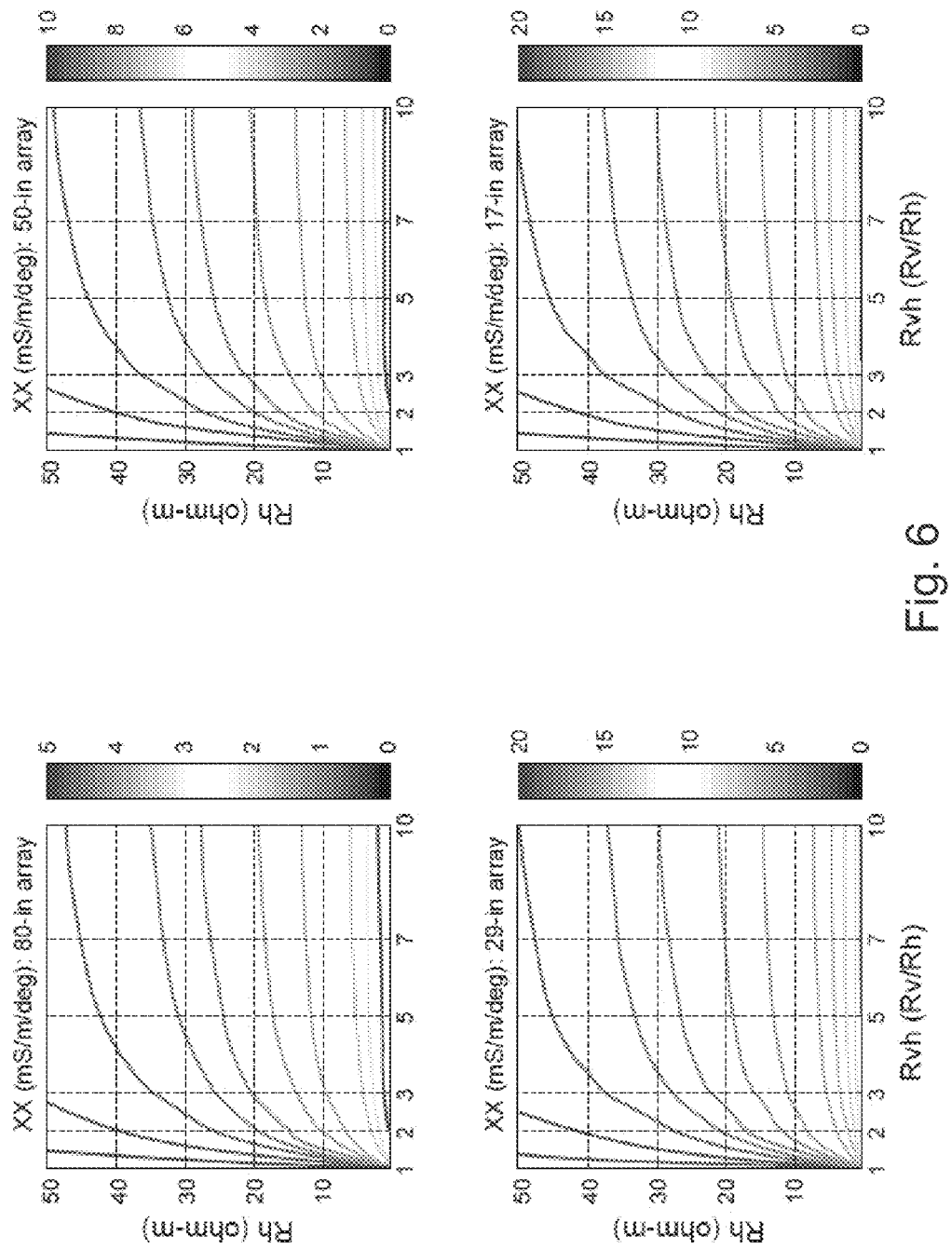
FIG. 6 is a plot illustrating the sensitivity of XX components of four arrays operated at 12 k to formation dip vs. formation Rh and Rvh in a formation.
Figure 7:
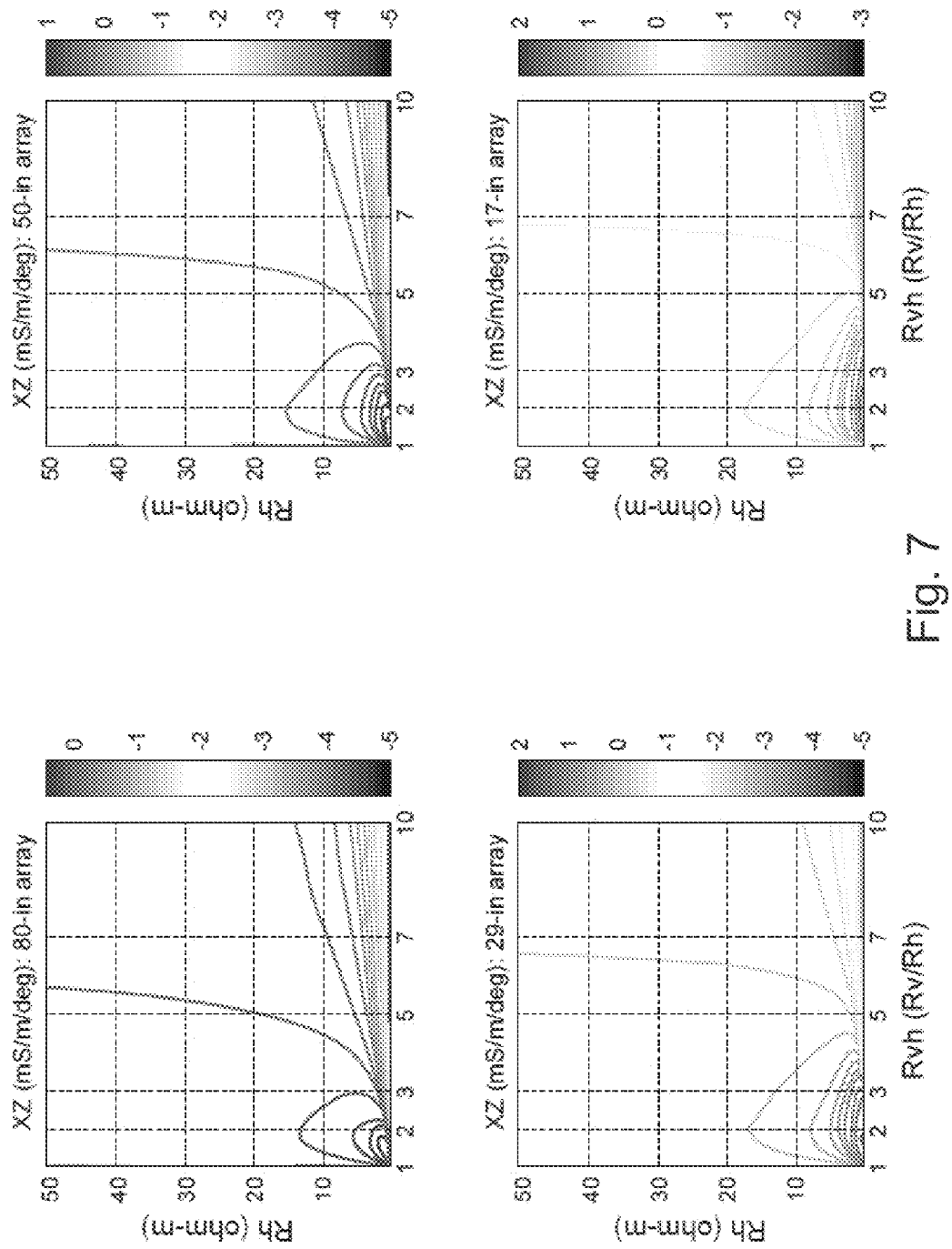
FIG. 7 is a plot illustrating the sensitivity of XZ components of four arrays operated at 12 k to formation dip vs. formation Rh and Rvh in a formation.
Figure 8:
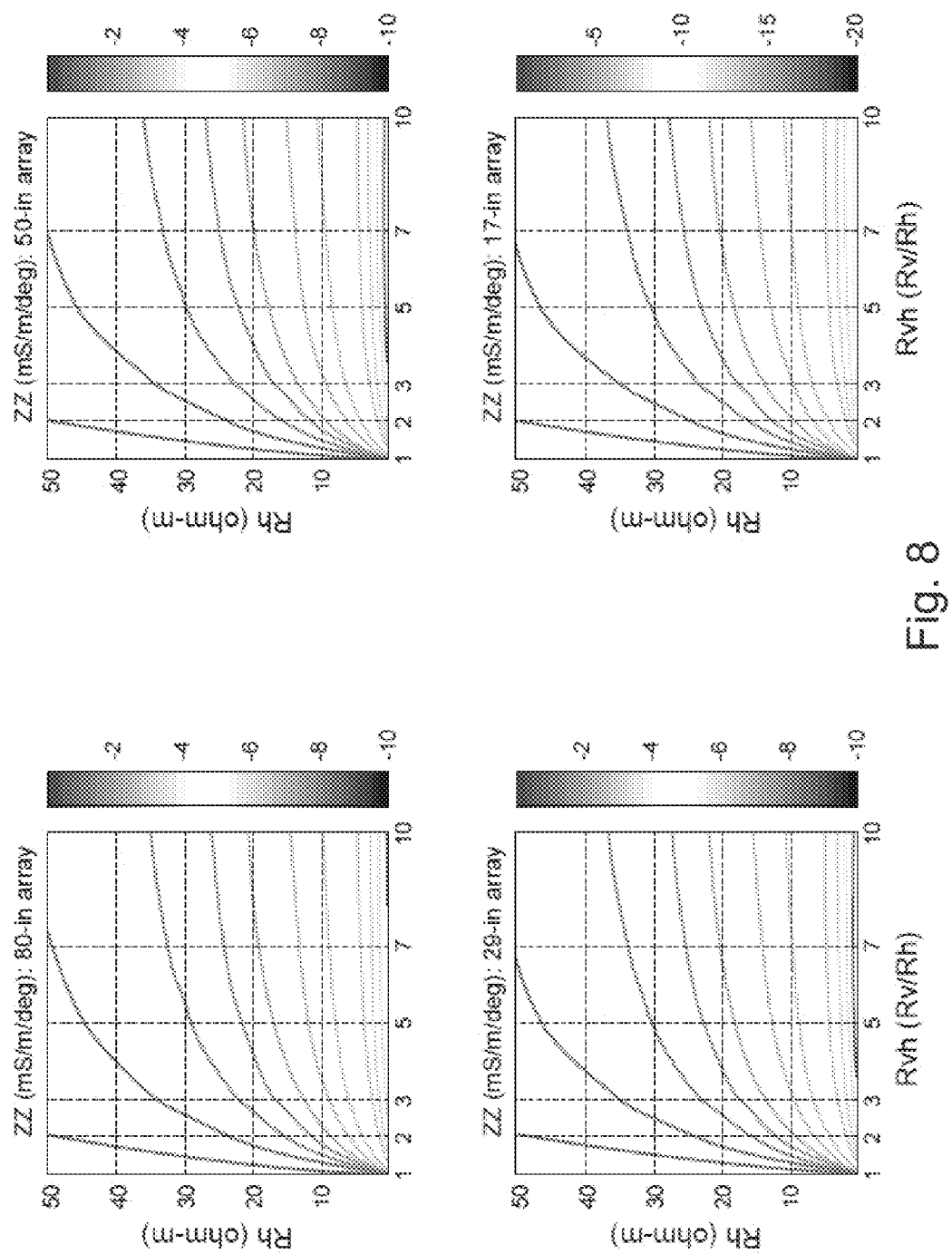
FIG. 8 is a plot illustrating the sensitivity of ZZ components of four arrays operated at 12 k to formation dip vs. formation Rh and Rvh in a formation.

FIGS. 6-8 are plots displaying the sensitivities of three components—XX, XZ, and ZZ (components XX and YY have similar sensitivities, and the XZ sensitivity is similar to the ZX. Therefore, the ZX and YY sensitivities are not displayed, as their displayed plots would be duplicative of the XZ and XX plots, respectively.) On each plot, the sensitivities of four different sub-arrays are displayed (e.g., 80, 50, 29, and 17-inch sub-arrays). FIG. 6 illustrates the sensitivity of XX components of four arrays operated at 12 k to formation dip vs. formation $R_h$ and $R_{vh}$ in a full-space formation (dip=50°, and azimuth=0°). FIG. 7 illustrates the sensitivity of XZ components of four arrays operated at 12 k to formation dip vs. formation $R_h$ and $R_{vh}$ in a full-space formation. FIG. 8 illustrates the sensitivity of ZZ components of four arrays operated at 12 k to formation dip vs. formation $R_h$ and $R_{vh}$ in a full-space formation. All other parameters in FIGS. 7-8 remain the same as ones shown in FIG. 6.

As illustrated in FIGS. 6-8, the sensitivity behaviors for the different sub-arrays are comparable. Sensitivity values are zero at $R_{vh}=1$ and decrease sharply as the $R_{vh}$ approaches one from higher values, especially at high-$R_h$ formation, such as $R_h$>40 ohm-m. For three diagonal components, there is a blind spot at $R_{vh}=1$. However, for the cross components XZ and ZX, a blind line exists along the zero contour line in the 2D distribution about the variables $R_h$ and $R_{vh}$ except $R_{vh}=1$ case.

Figure 9:
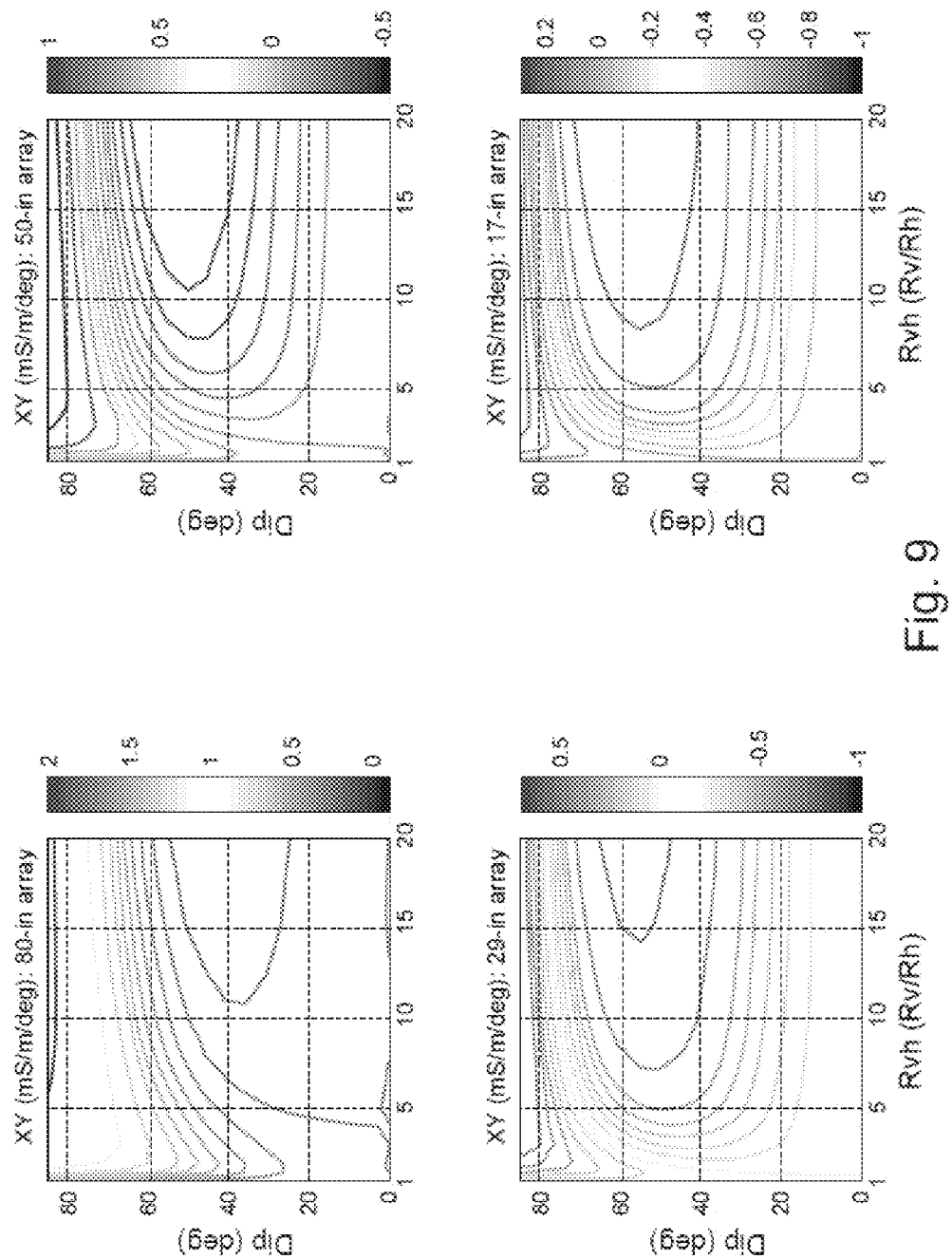
FIG. 9 is a plot illustrating the sensitivity of XY components of four arrays operated at 12 k to formation azimuth vs. formation dip and Rvh in a formation.
Figure 10:
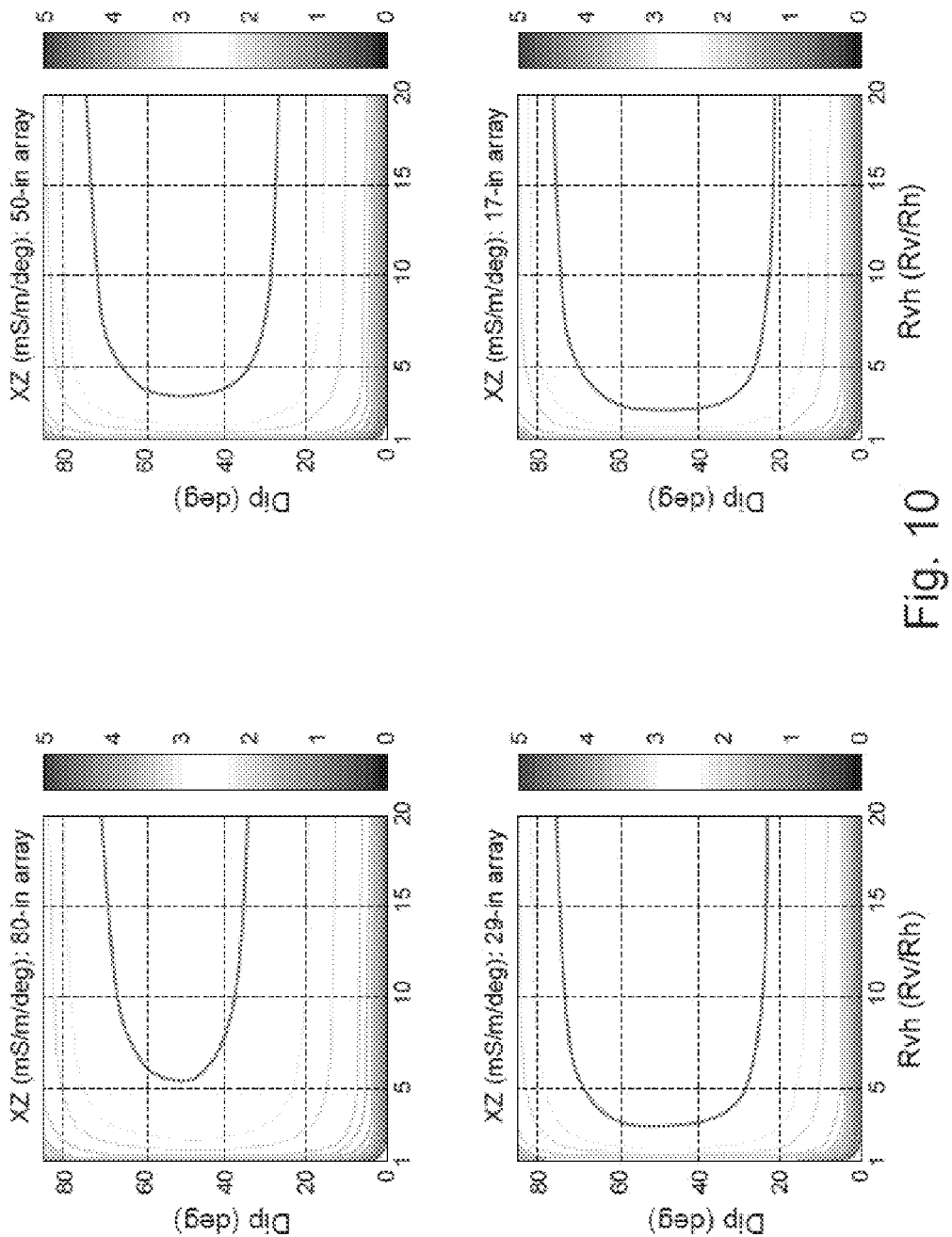
FIG. 10 is a plot illustrating the sensitivity of XZ components of four arrays operated at 12 k to formation azimuth vs. formation dip and Rvh in a formation.

FIG. 9 is a plot illustrating the sensitivity of XY components of four arrays (e.g., 80, 50, 29, and 17-inch arrays) operated at 12 k to formation azimuth vs. formation dip and $R_{vh}$ in a full-space formation, the full-space formation referring to the homogenous, full-space formation outside of the borehole, as previously discussed. FIG. 10 illustrates the sensitivity of XZ components of four arrays operated at 12 k to formation azimuth vs. formation dip and $R_{vh}$ in a full-space formation. The operating parameters are changed to Rh=2 ohm-m, and azimuth=70° for this calculation regarding the calculation of the sensitivity to the formation azimuth. The sensitivity to the formation azimuth is a function of two variables of formation dip and its anisotropic ratio $R_{vh}$. As components of XY, YX, XX, and YY have the similar sensitivity distribution, XZ, YZ, ZX, and ZY have the similar sensitivity distribution, and the ZZ component is insensitive to the variation of formation azimuth, FIGS. 9 and 10 only show the sensitivity results of two components XY and XZ. The components XY and XZ have no sensitivity to the azimuth at dip=0 or $R_{vh}=1$. Further, the sensitivity of the XZ component is stronger than that that of the component XY.

Enhanced Determination of Dip and Azimuth

R1D and 0D inversions for real-time MCI data processing are based on the R1D model (e.g., as illustrated in FIG. 4) and 0D model. In full-space isotropic formations (e.g., $R_v/R_h=1$ or $R_{vh}=1$) or aero-dip formations, the MCI measurements have no sensitivity to dip and azimuth angles. Therefore, when the anisotropic ratio $R_{vh}$ is very close to 1 or the dip is low, the accuracy of the recovered dip and azimuth angles decreases sharply. In an embodiment, the inversion accuracy as the $R_{vh}$ approaches 1 is improved by using dips and azimuths from surrounding beds with higher $R_{vh}$ values to renew the current layer's dip and azimuth after the regular R1D inversion is done.

Figure 11A:
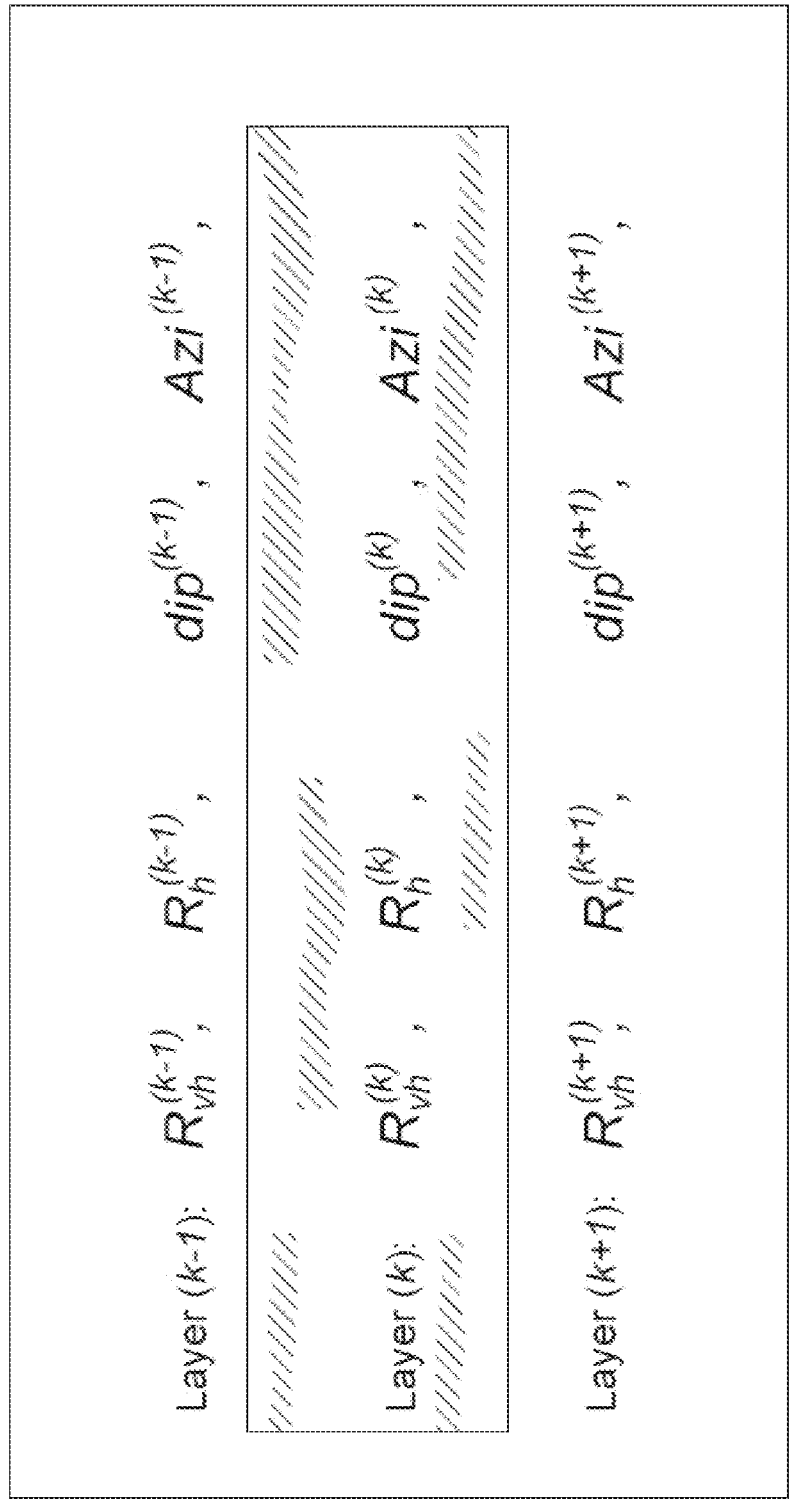
FIGS. 11A-11B are diagrams illustrating schematics of an example three-layer formation model.

FIG. 11A is a diagram of an example three-layer formation model for the enhanced determination of both dip and azimuth. Each layer is described by the five parameters: layer index, formation anisotropic ratio, horizontal resistivity, dip, and azimuth ("Azi").

When $R_{vh}^{(k)}>R_{vh}^{(min)}$, the renewed dip and azimuth are equal to the current values: $dip_{new}^{(k)}=dip^{(k)}$, and $Azi_{new}^{(k)}=Azi^{(k)}$, Here $R_{vh}^{(min)}$ is a predetermined threshold value.

When $R_{vh}^{(k)} \leq R_{vh}^{(min)}$, the renewed $dip^{(k)}$ and $Azi^{(k)}$ are generated with the following equations:
If $R_{vh}^{(k)} \leq R_{vh}^{(k-1)}$ and $R_{vh}^{(k)} \leq R_{vh}^{(k+1)}$, $dip^{(k)}$ and $Azi^{(k)}$ are renewed with the following:

$$dip_{new}^{(k)} = f_{dip}(R_{vh}^{(k-1)}, R_{vh}^{(k)}, R_{vh}^{(k+1)}, dip^{(k-1)}, dip^{(k)}, dip^{(k+1)})$$

$$Azi_{new}^{(k)} = f_{Azi}(R_{vh}^{(k-1)}, R_{vh}^{(k)}, R_{vh}^{(k+1)}, Azi^{(k-1)}, Azi^{(k)}, Azi^{(k+1)}) \quad (3)$$

If $R_{vh}^{(k)} \leq R_{vh}^{(k-1)}$ only, $dip^{(k)}$ and $Azi^{(k)}$ are renewed with the following:

$$dip_{new}^{(k)} = f_{dip}(R_{vh}^{(k-1)}, R_{vh}^{(k)}, dip^{(k-1)}, dip^{(k)})$$

$$Azi_{new}^{(k)} = f_{Azi}(R_{vh}^{(k-1)}, R_{vh}^{(k)}, Azi^{(k-1)}, Azi^{(k)}) \quad (4)$$

If $R_{vh}^{(k)} \leq R_{vh}^{(k+1)}$ only, $dip^{(k)}$ and $Azi^{(k)}$ are renewed with the following:

$$dip_{new}^{(k)} = f_{dip}(R_{vh}^{(k)}, R_{vh}^{(k+1)}, dip^{(k)}, dip^{(k+1)})$$

$$Azi_{new}^{(k)} = f_{Azi}(R_{vh}^{(k)}, R_{vh}^{(k+1)}, Azi^{(k)}, Azi^{(k+1)}) \quad (5)$$

For the interpolations above, the linear, polynomial, or spline interpolation algorithms, or any combination of the above may be used. If the dip and azimuth are not updated in the above enhancement, their quality indicators (QI) will be re-calculated using the following equations:

$QI_{new}^{(dip)} = QI^{(dip)} \cdot W_1(R_h) \cdot W_2(R_{vh})$ represents an updated equation for the dip's QI. $QI^{(dip)}$ is the QI for formation dip and is calculated by using the conventional method. $QI_{new}^{(dip)}$ is the re-calculated QI for the dip. Higher qualities of the inversion causes higher QI for dip and azimuth. The higher for both $QI^{(dip)}$ and $QI_{new}^{(dip)}$; $W_1(R_h)(0 \leq W_1(R_h) \leq 1)$ is referred to as the correction coefficient which is dependent on the formation $R_h$. In a normal resistivity range for MCI measurements (e.g., $R_h < 50$ ohm-m), $W_1(R_h)$ is close to one. However, if the $R_h$ is very high, then $W_1(R_h)$ is close to zero. $W_2(R_{vh})(0 \leq W_2(R_h) \leq 1)$ is the correction coefficient which is dependent on the formation anisotropic ratio $R_{vh}$. If $R_{vh}=1$, then $W_2(R_{vh})=0$. For example, if $R_{vh}$ is close to one or $R_h$ is very high, then $QI_{new}^{(dip)}$ is very close to zero, or in other words, the formation dip is of the highest uncertainty.

$QI_{new}^{(azi)} = QI^{(azi)} \cdot W_1(R_h) \cdot W_2(R_{vh}) \cdot W_3(dip)$ represents an updated equation for the azimuth's QI. $W_3(dip)$ is the correction coefficient which is dependent on the formation dip. If dip=0, then $W_3(dip)=0$, or in other words, the formation azimuth angle is of the highest uncertainty.

Figure 11B:
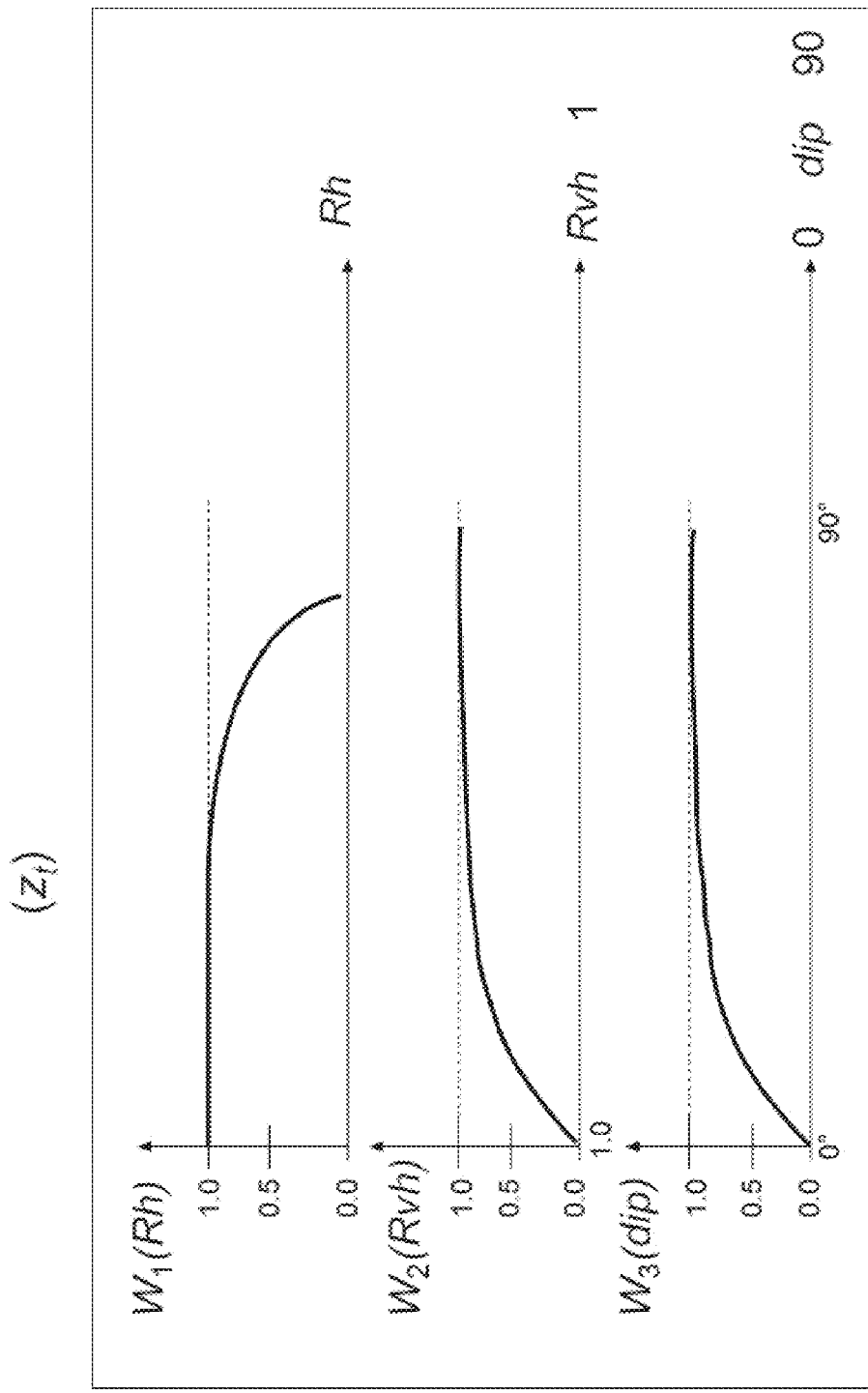

FIG. 11B is a plot of the W1 ($R_h$), W2 ($R_{vh}$), and W3 (dip) functions.

In another embodiment, dip and azimuth evaluation may be enhanced be adding additional terms into a cost function of numerical inversion to generate a modified cost function. By assuming that formation properties of previous adjacent layer (k−1) have been computed already, the modified cost function $CostFunction_{new}^{(k)}$ for calculating formation properties of layer (k) can be expressed by the following equation: $CostFunction_{new}^{(k)} = CostFunction_{origin}^{(k)} + \alpha(R_{vh}^k, R_{vh}^{k-1}) \cdot |dip^k - dip^{k-1}|^2 + \beta(R_{vh}^k, R_{vh}^{k-1}, dip^{k-1}) \cdot |azi^k - azi^{k-1}|^2$ $\alpha$ is a function of $R_{vh}^k$ and $R_{vh}^{k-1}$ and $\beta$ is a function of $R_{vh}^k$, $R_{vh}^{k-1}$, and $dip^{k-1}$, wherein:

$$\alpha = \begin{cases} \alpha_0, & \text{if } R_{vh}^k \text{ is very close to one and } R_{vh}^{k-1} \neq 1 \\ 0, & \text{else} \end{cases} \quad (6)$$

-continued
$$\beta = \begin{cases} \beta_0 & \text{if } R_{vh}^k = 1 \text{ and } R_{vh}^{k-1} \neq 1 \text{ and } dip^{k-1} \neq 0 \\ 0, & \text{else} \end{cases}$$

$\alpha_0$ and $\beta_0$ are pre-determined numbers through numerical experiments. Using the modified cost function, the inversion can adaptively enforce a constraint on calculated dip and azimuth angles. The additional terms only take effect on calculated dip angle when current layer is isotropic and previous layer is anisotropic. Further, the additional terms only take effect on calculated azimuth angle when current layer is isotropic or very close to isotropy, previous layer is anisotropic, and calculated dip angle of previous layer is not close to zero.

The $R_{vh}^{min}$ parameter is generally in the 1.05-1.25 range based on the location and depth of the well, and also based on measurement quality of the tool that is used. For real-time delivery of results, an average value of 1.10 may be used. However, the threshold value may be adjusted and optimized based on manual input in some ranges based on petro-physical knowledge and other expectations.

In addition to the methods described here that are based on using neighboring log points of MCI data, the results can be further improved based on petrophysical and stratigraphic a-priori knowledge by manually entering and forcing results in certain ranges. For example, when a dip value is available from other tools or from seismic data, a linear or non-linear combination of that value and (k−1) value can be used, rather than just using the (k−1) values ($dip^{k-1}$, $azi^{k-1}$) as described herein.

Figure 12:
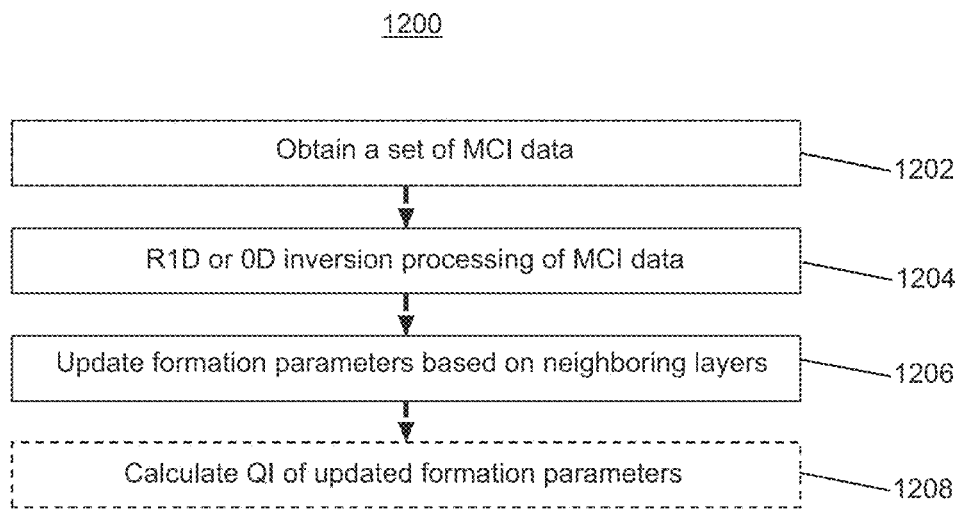
FIG. 12 is a flow diagram of an example formation property measuring process, according to one embodiment of the present disclosure.

Treating FIGS. 11A-11B as the basis for enhancing determinations of formation properties (namely, dip and azimuth), illustrated in FIG. 12 is a flow diagram of an example formation property measuring process 1200. Process 1200 starts at block 1202 by obtaining a set of multicomponent induction data. The set of multicomponent induction data includes data representing layers of downhole formations and can be obtained using the resistivity logging tools previously described in FIGS. 1-3. Next, at block 1204, inversion processing is performed on the set of multicomponent induction data to determine a set of formation parameters for each of the formation layers. The inversion processing can include either one of the R1D or 0D inversion of formation and hole parameters previously described in relation to FIGS. 4-5 to determine the formation parameters of horizontal resistivity ($R_h$), vertical resistivity ($R_v$), dip, and azimuth). The set of formation parameters for each of the formation layers can include at least one of a set of horizontal resistivity, a set of vertical resistivity, a set of dips, and a set of azimuths. Due to MCI measurements sometimes not being sensitive to certain formation parameters, the formation parameters are updated (e.g., renewed) in block 1206 based on formation an isotropic ratios of neighboring layers. In an embodiment, the updating includes renewing either the formation dip or azimuth parameter of a layer using dip or azimuth ratio parameters of neighboring layers, as previously described in relation to FIG. 11A. The process 1200 may further include an optional operation 1208, as indicated by the dashed lines, wherein a quality indicator of the updated dip and azimuth are calculated.

Figure 13:
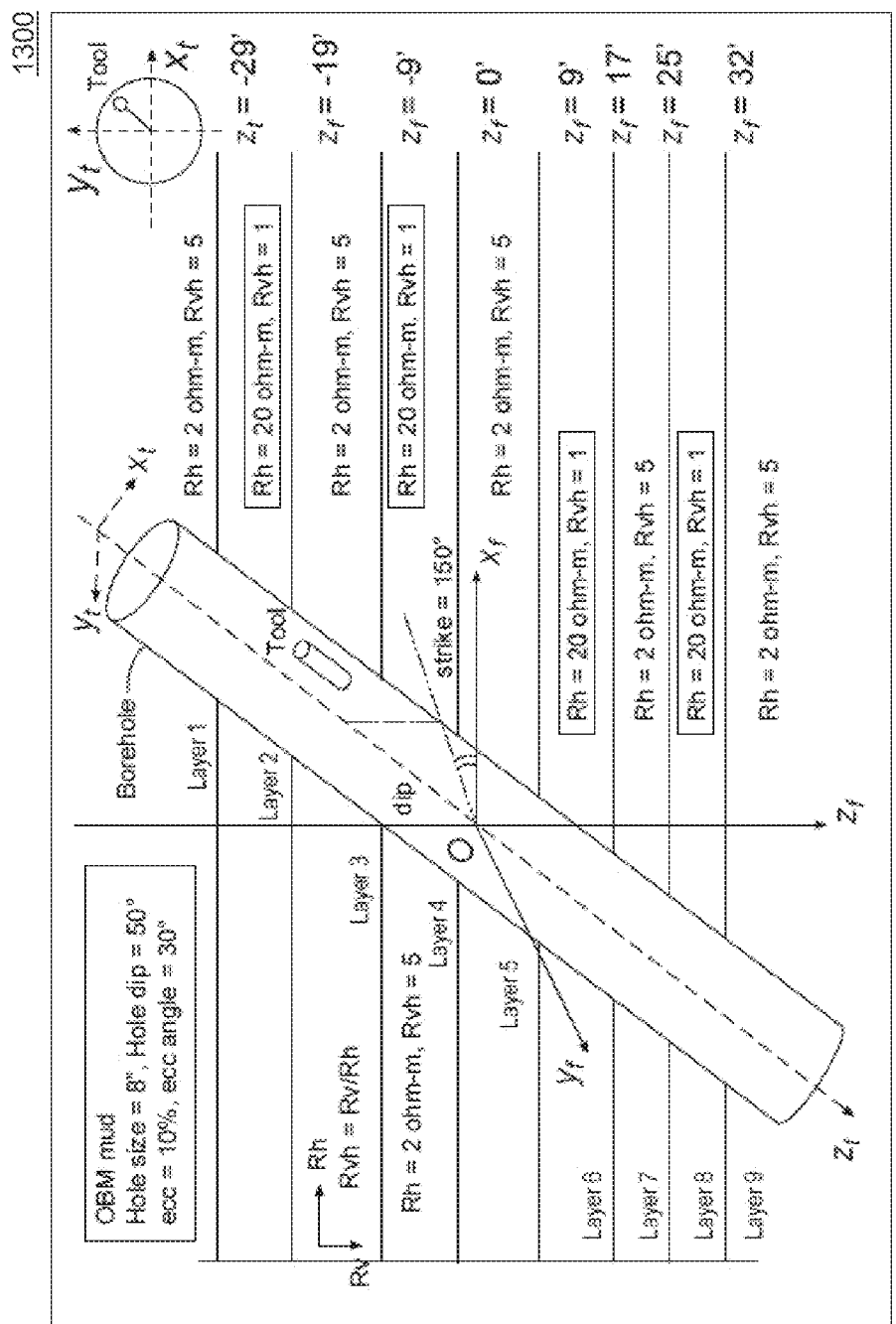
FIG. 13 is a diagram illustrating a three-dimensional, nine-layer borehole-formation model.
Figure 14:
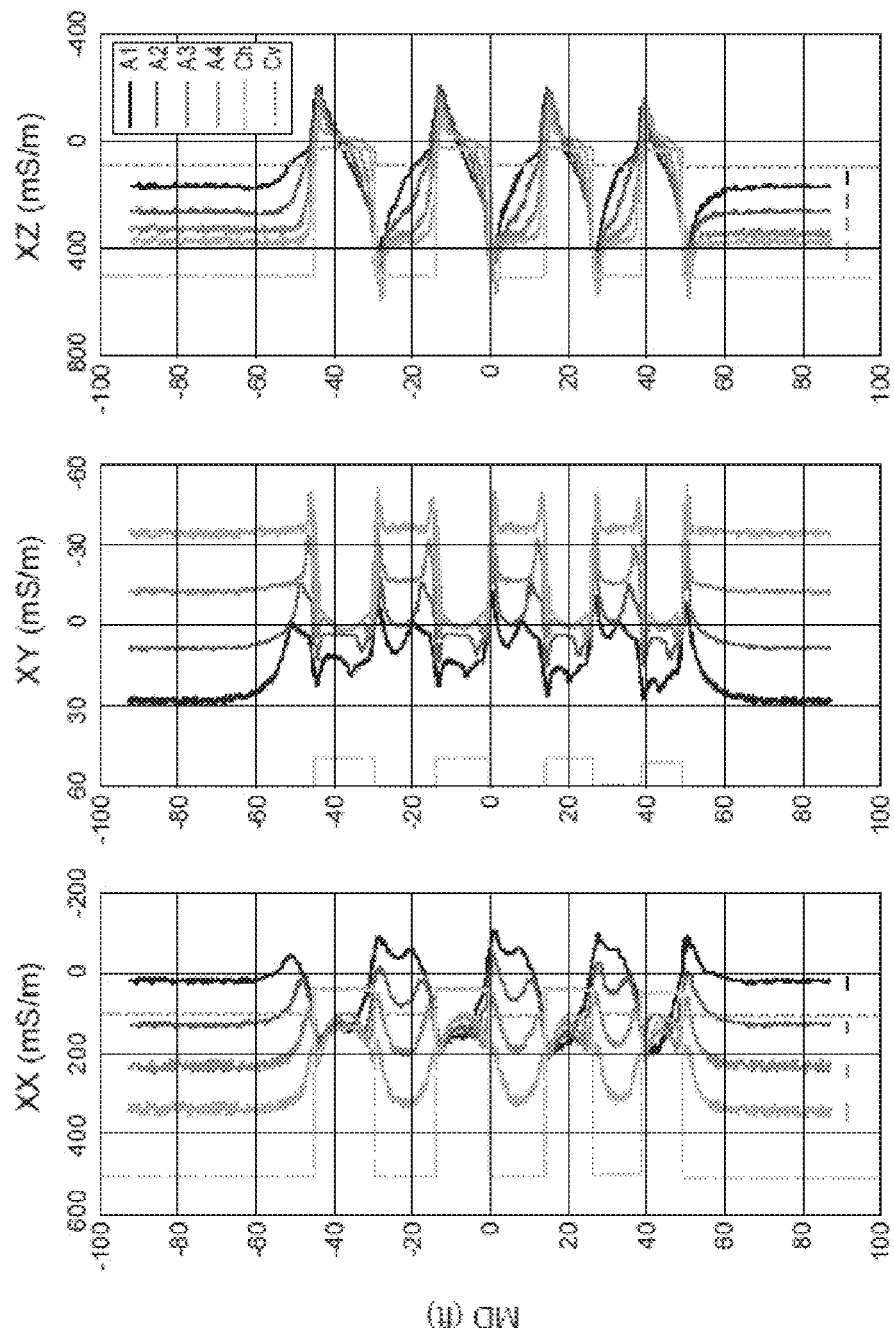
FIG. 14 is a plot illustrating XX, XY, and XZ-component logs of four subarrays.
Figure 15:
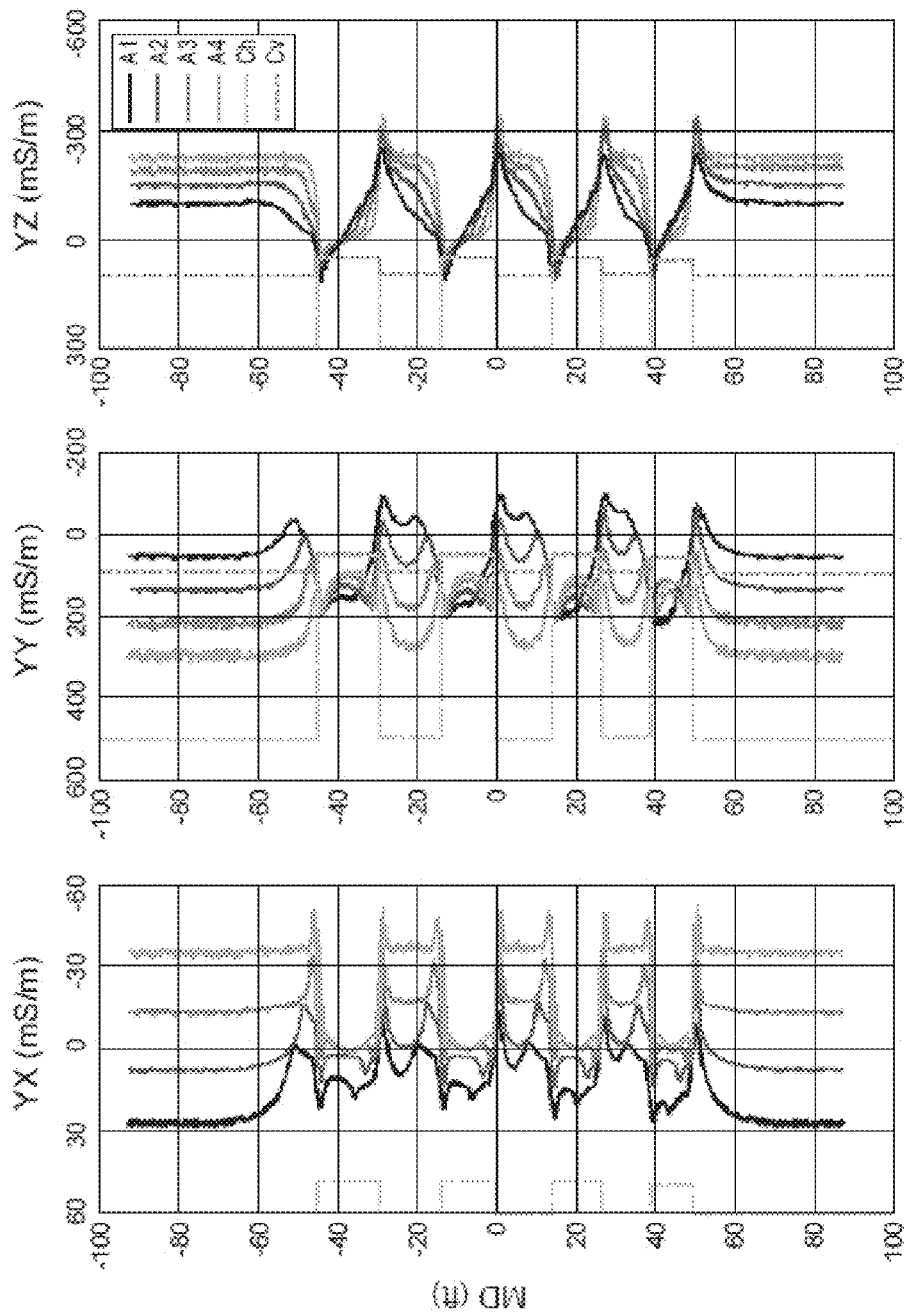
FIG. 15 is a plot illustrating YX, YY, and YZ-component logs of four subarrays.
Figure 16:
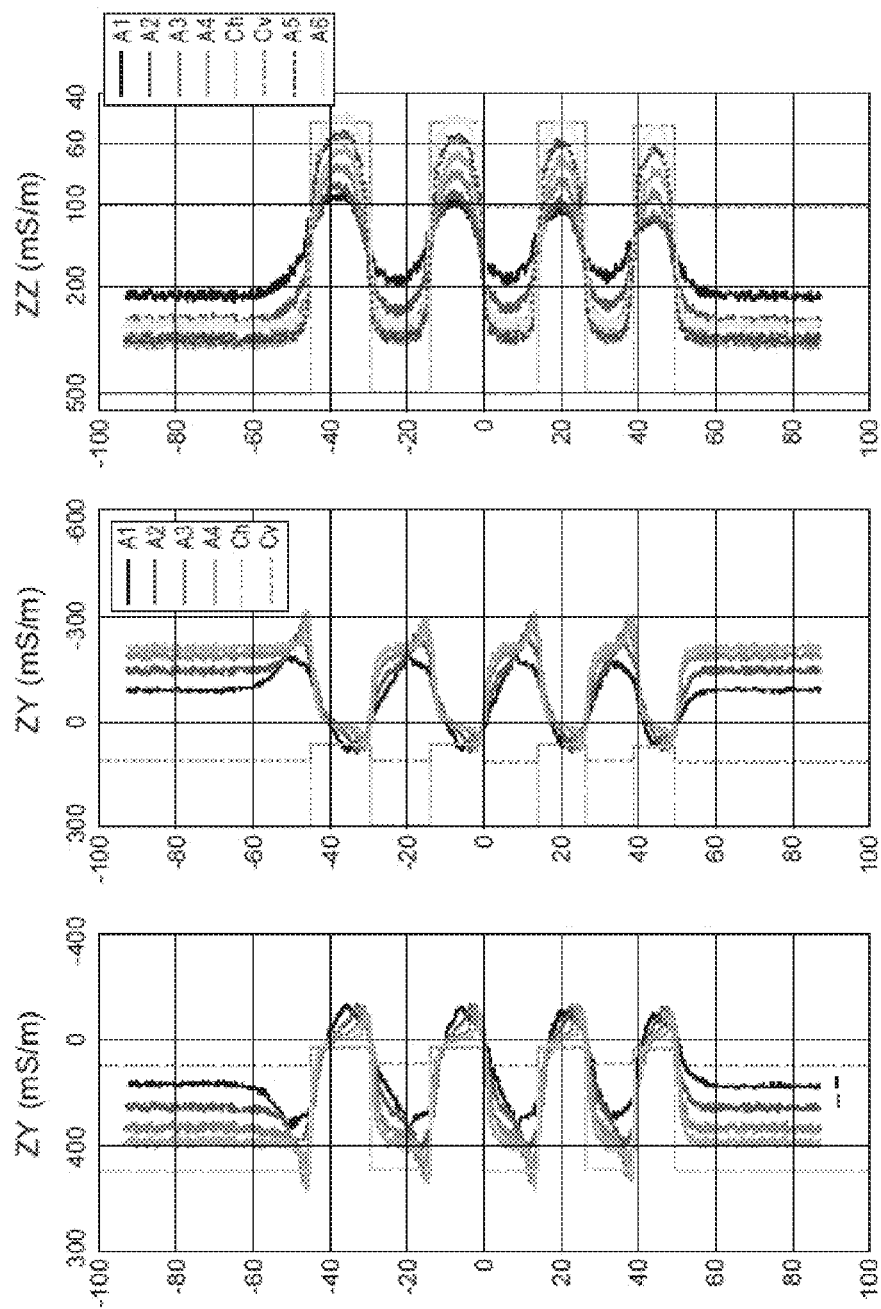
FIG. 16 is a plot illustrating ZX and ZY-component logs of four subarrays and ZZ-component logs of six subarrays.

FIG. 13 displays a diagram of a fully three-dimensional (3D) borehole-formation model 1300 that is used below to verify the methods disclosed above. It consists of a 9-layer formation penetrated by a deviated borehole. Layers 1, 3, 5, 7, and 9 in model 1300 are of TI anisotrophy ($R_{vh}=5$), and the remaining layers are isotropic ($R_{vh}=1$). The corresponding MCI synthetic data are simulated with the 3DFD code and the synthetic logs contaminated with a 5% pseudo-random error at 36k are presented in FIGS. 14-16. FIG. 14 illustrates XX, XY, and XZ-component logs of four sub-arrays at a frequency of 36 kHz and contaminated with a 5% pseudo-random error for the 3D model 1200 of FIG. 13. FIG. 15 illustrates YX, YY, and YZ-component logs of four sub-arrays at a frequency of 36 kHz contaminated with a 5% pseudo-random error for the 3D model 1200 of FIG. 13. FIG. 16 illustrates ZX and ZY-component logs of four sub-arrays and ZZ-component logs of six sub-arrays at a frequency of 36 kHz contaminated with a 5% pseudo-random error for the 3D model 1200 of FIG. 13.

Figure 17:
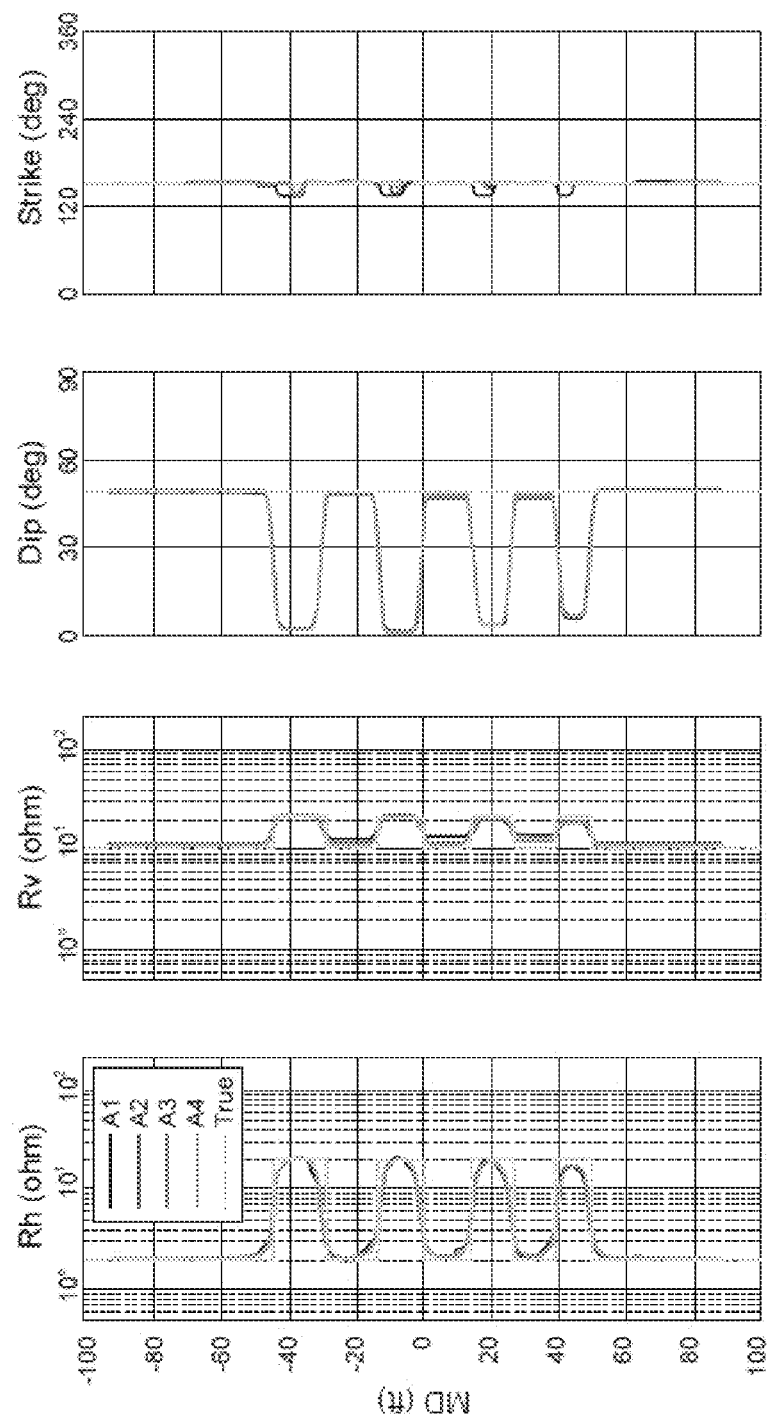
FIG. 17 is a plot illustrating recovered formation resistivities, dip, and azimuth from the R1D inversion of the MCI data without the enhanced determination of dip and azimuth.
Figure 18:
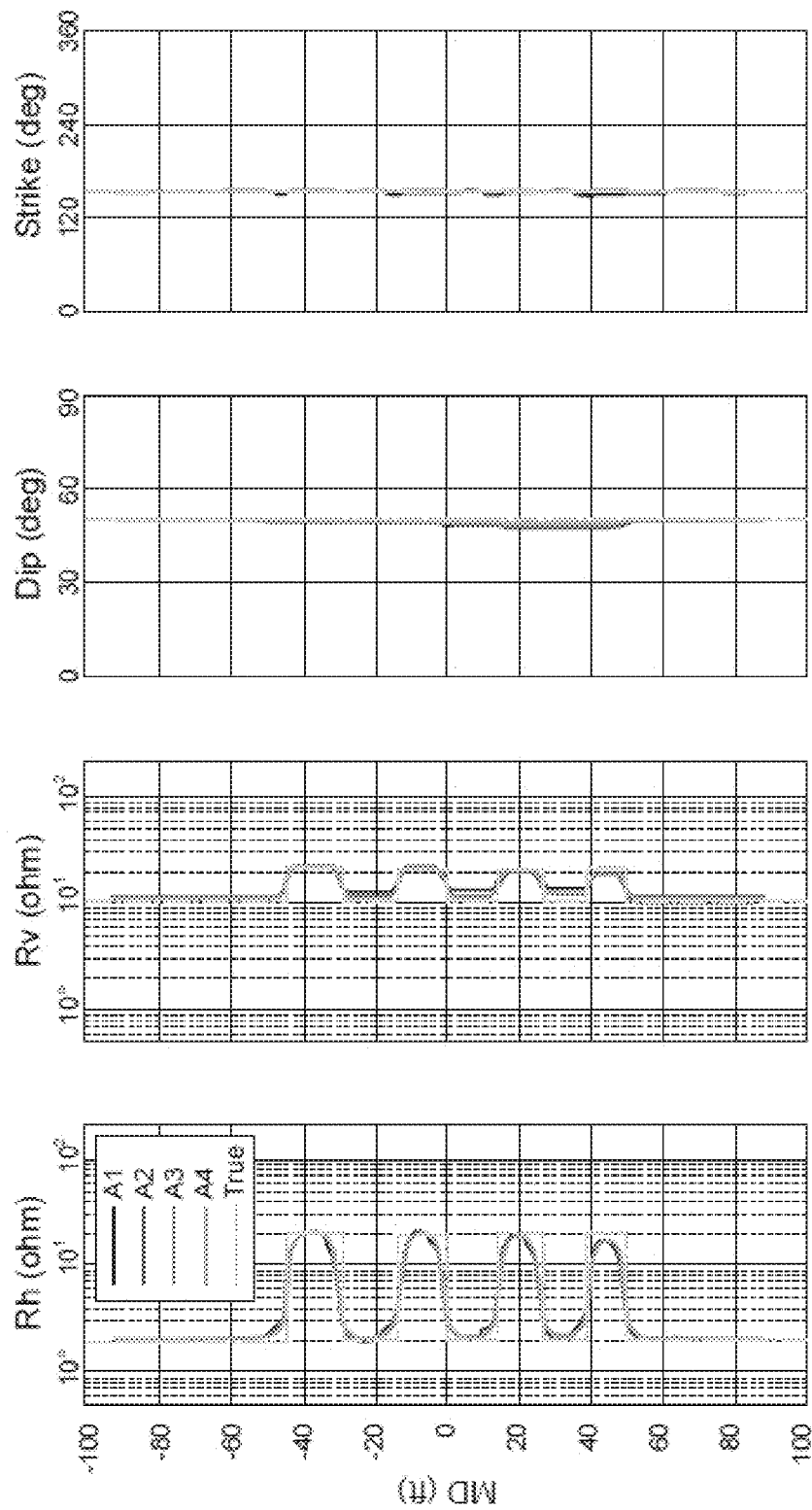
FIG. 18 is a plot illustrating recovered formation resistivities, dip, and azimuth from the R1D inversion of the MCI data with the enhanced determination of dip and azimuth.
Figure 19:
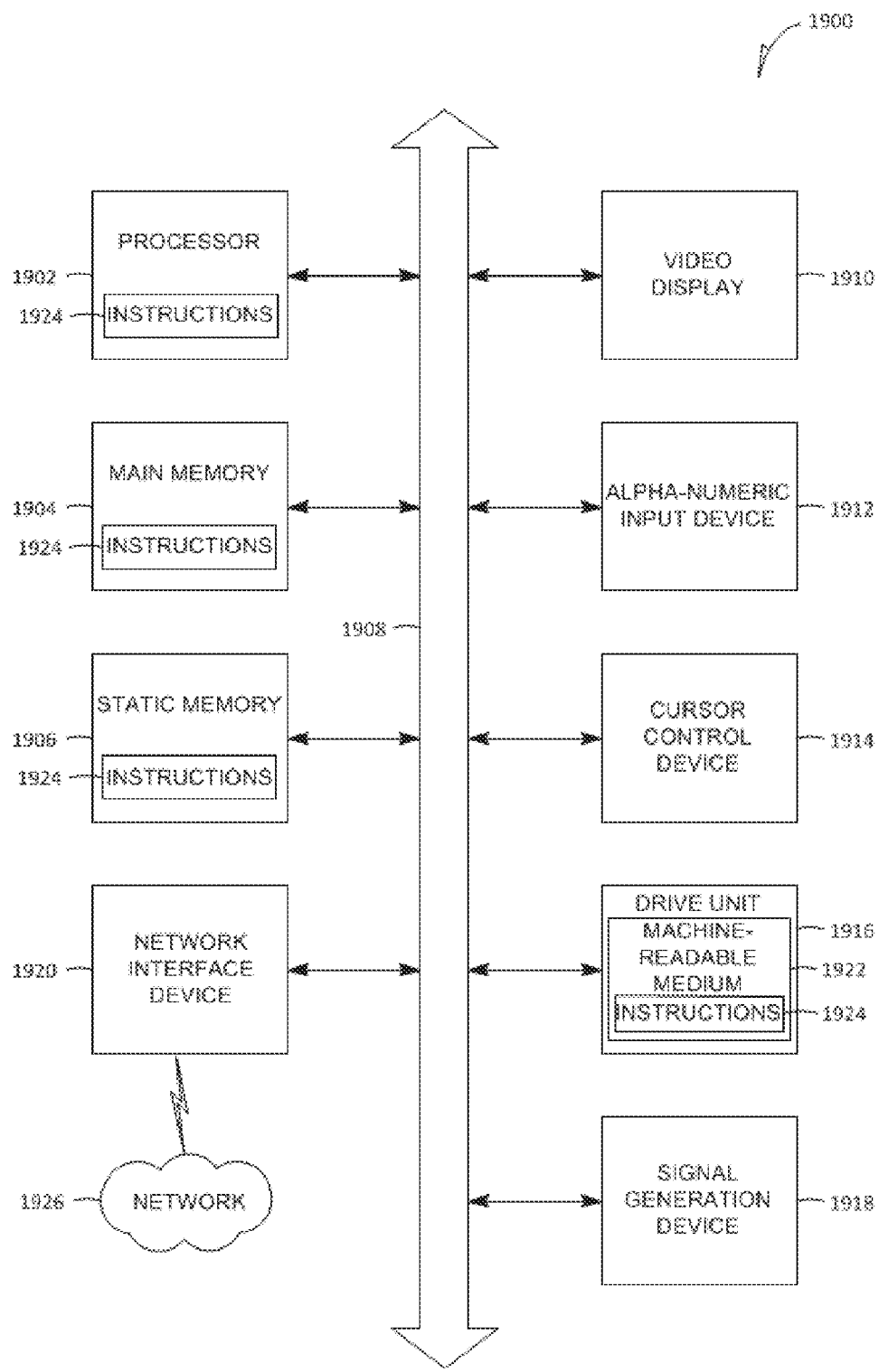
FIG. 19 is a diagrammatic representation of a machine in the example form of a computer system within which a set of instructions for causing the machine to perform any one or more of the methodologies discussed herein may be executed.

FIGS. 17-18 illustrate the recovered formation resistivities ($R_h$ and $R_v$), dip, and strike/azimuth from R1D inversion of the MCI data shown in FIG. 14-16 according to an embodiment (without and with the enhanced determination of dip and strike/azimuth, respectively). FIG. 17 displays recovered formation resistivities ($R_h$ and $R_v$), dip, and strike/azimuth from the R1D inversion of the MCI data without the enhanced determination of dip and strike/azimuth. In FIG. 17, the inverted dip and azimuth have significant differences compared to the true dip and azimuth in some sections with $R_{v/h}$=1. FIG. 17 displays recovered formation resistivities ($R_h$ and $R_v$), dip, and strike/azimuth from the R1D inversion of the MCI data with the enhanced determination of dip and strike/azimuth. In FIG. 18, the inverted dip and azimuth are much closer to the true parameters due to the application of the described methods for the enhanced determination of dip and azimuth. Hence this application demonstrates that this new method for the enhanced determination of dip and azimuth is able to effectively increase the inversion accuracy of formation dip and azimuth if the formation anisotropic ratio is low and so reduce the uncertainty of the inverted dip and azimuth.

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a workstation, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 16 is a block diagram of machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904 and a static memory 1606, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a user interface (UI) navigation device 1914 (e.g., a mouse), a disk drive unit 1916, a signal generation device 1918 (e.g., a speaker) and a network interface device 1920.

Machine-Readable Medium and Machine Readable Storage Medium

The disk drive unit 1916 includes a machine-readable medium 1922 on which is stored one or more sets of instructions and data structures (e.g., software) 1924 embodying or used by any one or more of the methodologies or functions described herein. The instructions 1924 may also reside, completely or at least partially, within the main memory 1904, static memory 1906, and/or within the processor 1902 during execution thereof by the computer system 1900, the main memory 1904 and the processor 1902 also constituting machine-readable media.

While the machine-readable medium 1922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing or encoding data structures used by or associated with such instructions. The term "machine-readable storage medium" shall accordingly be taken to include, but not be limited to, solid-state memories, and optical and magnetic media. Specific examples of machine-readable storage media include non-volatile memory, including by way of example, semiconductor memory devices (e.g., Erasable Programmable Read-Only Memory (EPROM), Dynamic Random Access Memory (DRAM), Electrically Erasable Programmable Read-Only Memory (EEPROM)) and flash memory devices; magnetic disks such as internal hard disks and removable disks; magneto-optical disks; and CD-ROM and DVD-ROM disks. All such machine readable storage media are hardware devices suitable for storing data and/or instructions for a suitable period of time to enable use by the machine, and are therefore non-transitory.

Transmission Medium

The instructions 1924 may further be transmitted or received over a communications network 1926 using a transmission medium. The instructions 1924 may be transmitted using the network interface device 1920 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for measuring formation properties, the method comprising:
    obtaining a set of multicomponent induction data, representing layers of downhole formations, from a logging tool having an antenna arrangement that provides the set of multicomponent induction data as a function of tool position in a borehole through the layers of the downhole formations;
    performing inversion processing on the set of multicomponent induction data to determine a set of formation parameters for each of the layers; and
    updating at least a portion of the set of formation parameters for each of the layers based on formation anisotropic ratios of neighboring layers.

2. The method of claim 1, wherein the step of performing inversion processing includes performing a radially one-dimensional inversion or performing a zero-dimensional inversion.

3. The method of claim 1, wherein the set of formation parameters represent at least one of a set of horizontal resistivity, a set of vertical resistivity, a set of dips, and a set of azimuths.

4. The method of claim 1, further comprising the step of generating a borehole correction log based on the determined set of formation parameters.

5. The method of claim 1, further comprising the step of calculating a set of quality indicators for the set of formation parameters.

6. The method of claim 1, wherein the step of updating at least a portion of the set of formation parameters includes renewing a formation dip parameter of a layer using formation dip parameters of neighboring layers.

7. The method of claim 1, wherein the step of updating at least a portion of the set of formation parameters includes renewing a formation azimuth parameter of a layer using formation dip parameters of neighboring layers.

8. The method of claim 1, wherein the step of updating at least a portion of the set of formation parameters includes renewing a formation dip parameter of a layer using formation anisotropic ratio parameters of neighboring layers.

9. The method of claim 1, wherein the step of updating at least a portion of the set of formation parameters includes renewing a formation azimuth parameter of a layer using formation anisotropic ratio parameters of neighboring layers.

10. The method of claim 1, wherein the step of updating at least a portion of the set of formation parameters is performed for a current layer in response to a determination that a formation anisotropic ratio or a formation dip of the current layer is lower than at least one of a neighboring layer's formation anisotropic ratio or a neighboring layer's formation dip.

11. A logging system, comprising:
a logging tool having a longitudinal tool axis and a perpendicular tool axis, the tool having an antenna arrangement that provides, as a function of tool position in a borehole, a set of multicomponent induction data representing layers of downhole formations, and
at least one processor; and
a memory device containing instructions that when execute by the at least one processor perform operations including:
performing inversion processing on the set of multicomponent induction data to determine a set of formation parameters for each of the layers; and
updating at least a portion of the set of formation parameters for each of the layers based on formation anisotropic ratios of neighboring layers.

12. The logging system of claim 11, wherein as part of performing the updating of at least a portion of the set of formation parameters, the at least one processor renews a formation dip parameter of a layer using formation dip parameters of neighboring layers.

13. The logging system of claim 11, wherein as part of performing the updating at least a portion of the set of formation parameters, the at least one processor renews a formation azimuth parameter of a layer using formation dip parameters of neighboring layers.

14. The logging system of claim 11, wherein as part of performing the updating at least a portion of the set of formation parameters, the at least one processor renews a formation azimuth parameter of a layer using formation anisotropic ratio parameters of neighboring layers.

15. The logging system of claim 11, wherein as part of performing the updating at least a portion of the set of formation parameters, the at least one processor renews a formation dip parameter of a layer using formation anisotropic ratio parameters of neighboring layers.

16. The logging system of claim 11, wherein the at least one processor updates at least a portion of the set of formation parameters for a current layer in response to a determination that a formation anisotropic ratio or a formation dip of the current layer is lower than at least one of a neighboring layer's formation anisotropic ratio or a neighboring layer's formation dip.

17. The logging system of claim 11, wherein the at least one processor further calculates a set of quality indicators for the set of formation parameters.

18. An apparatus for measuring formation properties, comprising:
a computing device, including,
a display and a user interface,
one or more processors, the one or more processors coupled to the display, and
one or more memory devices coupled to the processors; and
one or more programs stored in one or more of the memory devices, the one or more programs comprising instructions to cause the one or more processors to,
obtain a set of multicomponent induction data representing layers of downhole formations;
perform inversion processing on the set of multicomponent induction data to determine a set of formation parameters for each of the layers; and
update at least a portion of the set of formation parameters for each of the layers based on formation anisotropic ratios of neighboring layers.

* * * * *